(12) United States Patent
You et al.

(10) Patent No.: US 12,732,836 B2
(45) Date of Patent: Sep. 8, 2026

(54) COMMUNICATION METHOD AND APPARATUS

(71) Applicant: Huawei Technologies Co., Ltd., Shenzhen (CN)

(72) Inventors: Chunhua You, Shanghai (CN); Chong Lou, Shanghai (CN); Jagdeep Singh Ahluwalia, Reading (GB)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 18/756,557

(22) Filed: Jun. 27, 2024

(65) Prior Publication Data

US 2024/0357386 A1 Oct. 24, 2024

Related U.S. Application Data

(63) Continuation of application No. PCT/CN2022/141818, filed on Dec. 26, 2022.

(30) Foreign Application Priority Data

Dec. 28, 2021 (CN) ........................ 202111628719.6

(51) Int. Cl.
*H04W 24/04* (2009.01)
*H04W 76/27* (2018.01)

(52) U.S. Cl.
CPC ........... *H04W 24/04* (2013.01); *H04W 76/27* (2018.02)

(58) Field of Classification Search
None
See application file for complete search history.

(56) References Cited

U.S. PATENT DOCUMENTS

2023/0284329 A1* 9/2023 Agiwal ................ H04W 76/27
370/331
2024/0080699 A1* 3/2024 You ...................... H04W 24/10

FOREIGN PATENT DOCUMENTS

WO 2022236484 A1 11/2022

* cited by examiner

*Primary Examiner* — Anh Ngoc M Nguyen
(74) *Attorney, Agent, or Firm* — Slater Matsil, LLP

(57) ABSTRACT

This application provides a communication method and apparatus, and relates to the communication field, to resolve a problem that resource utilization is low because a network device cannot release a context of a terminal device in a timely manner when an SDT failure occurs, thereby improving resource utilization. The method includes: obtaining small data transmission SDT failure information; releasing an access stratum AS context of a terminal device based on the SDT failure information; and sending a first request message to a core network device. The first request message includes the SDT failure information, and the first request message is used to request the core network device to release a non-access stratum NAS context of the terminal device.

20 Claims, 12 Drawing Sheets

COMMUNICATION METHOD AND APPARATUS

CROSS-REFERENCE TO RELATED APPLICATIONS

This application is a continuation of International Application No. PCT/CN2022/141818, filed on Dec. 26, 2022, which claims priority to Chinese Patent Application No. 202111628719.6, filed on Dec. 28, 2021. The disclosures of the aforementioned applications are hereby incorporated by reference in their entireties.

TECHNICAL FIELD

This application relates to the communication field, and in particular, to a communication method and apparatus.

BACKGROUND

In a 5th generation (5G) communication system, a terminal device has three radio resource control (radio resource control, RRC) states: an RRC connected (RRC_CONNECTED) state, an RRC idle (RRC_IDLE) state, and an RRC inactive (RRC_INACTIVE) state. When the terminal device transmits data, regardless of a size of the data, the terminal device in the RRC inactive state needs to be switched to the RRC connected state, that is, an RRC connection to a network device is resumed, and then the terminal device can complete data transmission. However, for some small data service transmission, the terminal device also needs to perform a complete RRC resume procedure to enter the RRC connected state before performing data transmission, and a quantity of signaling interaction is large. Consequently, signaling overheads are increased, a data transmission delay is long, and a large quantity of resources are occupied, and energy consumption of the terminal device is high.

Therefore, currently, when the terminal device is in the RRC inactive state, the terminal device may transmit a small data service by using a small data transmission (SDT) mechanism, for example, send small data by using a preconfigured uplink resource. In this state, the terminal device can complete data transmission without switching from the RRC inactive state to the RRC connected state.

Currently, when an SDT failure occurs, the network device does not know that the terminal device has released a context, and still stores the context of the terminal device. Consequently, a resource waste is caused, and resource utilization is low.

SUMMARY

This application provides a communication method and apparatus, to resolve a problem that resource utilization is low because a network device cannot release a context of a terminal device in a timely manner in the conventional technology.

According to a first aspect, a communication method is provided, the method is applied to a first access network device, and the method includes: obtaining small data transmission SDT failure information; releasing an access stratum AS context of a terminal device based on the SDT failure information; and sending a first request message to a core network device, where the first request message includes the SDT failure information, and the first request message is used to request the core network device to release a non-access stratum NAS context of the terminal device.

Based on the communication method according to the first aspect, the first access network device may determine, by obtaining the SDT failure information, that SDT data transmission with the terminal device fails, to release the AS context of the terminal device in a timely manner based on the SDT failure information without knowing that the terminal device has completed release of a context, and notify the core network device to release the NAS context of the terminal device in a timely manner, so that the terminal device, the first access network device, and the core network device release the context of the terminal device according to a same rule, and statuses of the terminal device that are recorded by the three devices are consistent. In this way, resources are saved, and resource utilization is improved.

In a possible design solution, the obtaining small data transmission SDT failure information specifically includes: receiving a second request message from the terminal device, where the second request message is used to request to resume an RRC connection; and starting SDT failure monitoring based on the second request message, and obtaining the SDT failure information. In this way, an SDT monitoring mechanism may be set in the first access network device to obtain the SDT failure information, and the SDT failure information does not need to be obtained from the terminal device, thereby reducing signaling interaction. Therefore, an SDT failure can be detected in time, and the context of the terminal device can be released, thereby improving resource utilization.

In another possible design solution, the obtaining small data transmission SDT failure information specifically includes: receiving the SDT failure information from a second access network device. In this way, the first access network device may alternatively obtain the SDT failure information from the second access network device. The second access network device may set an SDT failure monitoring mechanism or obtain the SDT failure information from the terminal device, so that the first access network device can release the context of the terminal device in a timely manner, thereby avoiding resource occupation.

In a possible design solution, the first access network device includes a distributed unit and a central unit, and the AS context includes a first AS context and a second AS context; and the releasing an access stratum AS context of a terminal device based on the SDT failure information specifically includes: releasing the first AS context of the terminal device based on the SDT failure information by using the distributed unit; and sending a third request message to the central unit by using the distributed unit, where the third request message includes the SDT failure information, and the third request message is used to request the central unit to release the second AS context of the terminal device. In this way, the first access network device may obtain the SDT failure information by using the distributed unit based on a split architecture, and release the AS context of the terminal device based on information exchange between the distributed unit and the central unit.

In another possible design solution, the first access network device includes a distributed unit and a central unit, and the AS context includes a first AS context and a second AS context; and the releasing an access stratum AS context of a terminal device based on the SDT failure information specifically includes: releasing the second AS context of the terminal device based on the SDT failure information by using the central unit; and sending a fourth request message to the distributed unit by using the central unit, where the fourth request message includes the SDT failure information, and the fourth request message is used to request the distributed unit to release the first AS context of the terminal device. In this way, the first access network device may alternatively obtain the SDT failure information by using the central unit, and further exchange information with the distributed unit, to jointly complete release of the AS context of the terminal device by the first access network device.

Further, the sending a first request message to a core network device specifically includes: sending the first request message to the core network device by using the central unit.

Further, the SDT failure information includes one or more of the following: duration of an SDT process is greater than or equal to a first SDT duration threshold; or a quantity of radio link control RLC retransmissions of SDT data reaches a first threshold for the quantity of RLC retransmissions of the SDT data. In this way, the first access network device may determine that SDT fails based on the monitored SDT duration and the quantity of RLC retransmissions, to exchange the SDT failure information in a timely manner to complete release of the context of the terminal device, thereby improving resource utilization.

Optionally, the communication method according to the first aspect further includes: receiving an acknowledgment message from the core network device, where the acknowledgment message indicates that the core network device has completed release of a NAS context of the terminal device. In this way, the first access network device may determine, based on the acknowledgment message, that the core network device has completed release of the NAS context of the terminal device, and further determine that the terminal device enters an idle state.

According to a second aspect, a communication method is provided, the method is applied to a second access network device, and the method includes: obtaining small data transmission SDT failure information; and sending the SDT failure information to a first access network device.

Further, the obtaining small data transmission SDT failure information specifically includes: receiving the SDT failure information from a terminal device.

According to a third aspect, a communication method is provided. The method is applied to a terminal device. The method includes: sending small data transmission SDT failure information to a second access network device.

In addition, based on the communication methods in the second aspect and the third aspect, a first access network device may directly or indirectly obtain the SDT failure information from the second access network device or the terminal device, to release a context of the terminal device based on the SDT failure information, thereby improving resource utilization.

According to a fourth aspect, a communication method is provided, the method is applied to a core network device, and the method includes: receiving a first request message from a first access network device, where the first request message is used to request the core network device to release a non-access stratum NAS context of a terminal device, and the first request message includes small data transmission SDT failure information; and releasing the NAS context of the terminal device based on the SDT failure information.

Optionally, the communication method according to the fourth aspect further includes: sending an acknowledgment message to the first access network device, where the acknowledgment message indicates that the core network device has completed release of the NAS context of the terminal device.

In addition, for technical effect of the communication method according to the fourth aspect, refer to the technical effect of the communication method according to the first aspect. Details are not described herein again.

According to a fifth aspect, a communication method is provided, the method is applied to a first access network device, and the method includes: obtaining small data transmission SDT failure information; and determining SDT configuration information based on the SDT failure information, where the SDT configuration information includes one or more of the following: a second SDT duration threshold, a second threshold for a quantity of RLC retransmissions, a second cell reselection threshold, or a second threshold for a quantity of retransmissions of a random access preamble. The second SDT duration threshold is greater than a first SDT duration threshold, the second threshold for the quantity of RLC retransmissions of the SDT data is greater than a first threshold for the quantity of RLC retransmissions of the SDT data, the second cell reselection threshold is greater than a first cell reselection threshold, and the second threshold for the quantity of retransmissions of the random access preamble is greater than a first threshold for the quantity of retransmissions of the random access preamble. The first SDT duration threshold, the first threshold for the quantity of RLC retransmissions of the SDT data, the first cell reselection threshold, or the first threshold for the quantity of retransmissions of the random access preamble is used to determine the SDT failure information.

Based on the communication method according to the fifth aspect, the first access network device may optimize the SDT configuration information based on the exchanged SDT failure information, so that a specified threshold is increased. This prevents another terminal device from entering an RRC idle state too early when communicating with the first access network device, thereby avoiding a data loss and improving data transmission reliability.

In a possible design solution, the obtaining small data transmission SDT failure information specifically includes: receiving the SDT failure information from a third access network device. In this way, the terminal device establishes a connection to the third access network device, so that the SDT failure information of the first access network device may be reported to the third access network device by the terminal device, and the third access network device sends the SDT failure information to the first access network device, to complete SDT configuration optimization.

Further, the SDT failure information includes one or more of the following: duration of an SDT process is greater than or equal to the first SDT duration threshold; or a quantity of radio link control RLC retransmissions of the SDT data reaches the first threshold for the quantity of RLC retransmissions of the SDT data; or a difference between quality of a signal received by the terminal device from the third access network device and quality of a signal received by the terminal device from the first access network device is greater than or equal to the first cell reselection threshold; or a quantity of retransmissions of the random access preamble reaches the first threshold for the quantity of retransmissions of the random access preamble; or an identifier of the first access network device; or an identifier of the terminal device.

According to a sixth aspect, a communication apparatus is provided, where the apparatus includes a processing module and a sending module; the processing module is configured to obtain small data transmission SDT failure information; the processing module is further configured to release an access stratum AS context of a terminal device based on the SDT failure information; and the sending module is configured to send a first request message to a core network device, where the first request message includes the SDT failure information, and the first request message is used to request the core network device to release a non-access stratum NAS context of the terminal device.

In a possible design solution, the processing module is specifically configured to perform the following steps: receiving a second request message from the terminal device, where the second request message is used to request to resume an RRC connection; and starting SDT failure monitoring based on the second request message, and obtaining the SDT failure information.

In another possible design solution, the processing module is specifically configured to receive the SDT failure information from a second access network device.

In a possible design solution, the processing module includes a distributed unit and a central unit, and the AS context includes a first AS context and a second AS context; the distributed unit is configured to release the first AS context of the terminal device based on the SDT failure information; and the distributed unit is further configured to send a third request message to the central unit, where the third request message includes the SDT failure information, and the third request message is used to request the central unit to release the second AS context of the terminal device.

In another possible design solution, the processing module includes a distributed unit and a central unit, and the AS context includes a first AS context and a second AS context; the central unit is configured to release the second AS context of the terminal device based on the SDT failure information; and the central unit is further configured to send a fourth request message to the distributed unit, where the fourth request message includes the SDT failure information, and the fourth request message is used to request the distributed unit to release the first AS context of the terminal device.

In a possible design solution, the central unit is further configured to send the first request message to the core network device.

Further, the SDT failure information includes one or more of the following: duration of an SDT process is greater than or equal to a first SDT duration threshold; or a quantity of radio link control RLC retransmissions of SDT data reaches a first threshold for the quantity of RLC retransmissions of the SDT data.

Optionally, the communication apparatus according to the sixth aspect may further include a receiving module; and the receiving module is configured to receive an acknowledgment message from the core network device, where the acknowledgment message indicates that the core network device has completed release of a NAS context of the terminal device.

Optionally, the sending module and the receiving module may be integrated into one module, for example, a transceiver module. The transceiver module is configured to implement a sending function and a receiving function of the communication apparatus according to the sixth aspect.

Optionally, the communication apparatus according to the sixth aspect may further include a storage module. The storage module stores a program or instructions. When the processing module executes the program or the instructions, the communication apparatus is enabled to perform the communication method according to the first aspect.

It should be noted that the communication apparatus according to the sixth aspect may be an access network device, or may be a chip (system) or another component or assembly that may be disposed in an access network device, or may be an apparatus including an access network device. This is not limited in this application.

According to a seventh aspect, a communication apparatus is provided, where the apparatus includes a processing module and a sending module; the processing module is configured to obtain small data transmission SDT failure information; and the sending module is configured to send the SDT failure information to a first access network device.

In a possible design solution, the processing module is specifically configured to receive the SDT failure information from a terminal device.

Optionally, the communication apparatus according to the seventh aspect may further include a receiving module. The processing module is configured to implement a receiving function of the communication apparatus according to the seventh aspect.

Optionally, the sending module and the receiving module may be integrated into one module, for example, a transceiver module. The transceiver module is configured to implement a sending function and a receiving function of the communication apparatus according to the seventh aspect.

Optionally, the communication apparatus according to the seventh aspect may further include a storage module. The storage module stores a program or instructions. When the processing module executes the program or the instructions, the communication apparatus is enabled to perform the communication method according to the second aspect.

It should be noted that the communication apparatus according to the seventh aspect may be an access network device, or may be a chip (system) or another component or assembly that may be disposed in an access network device, or may be an apparatus including an access network device. This is not limited in this application.

According to an eighth aspect, a communication apparatus is provided, where the apparatus includes a sending module; and the sending module is configured to send small data transmission SDT failure information to a second access network device.

Optionally, the communication apparatus according to the eighth aspect may further include a receiving module. The receiving module is configured to implement a receiving function of the communication apparatus according to the eighth aspect.

Optionally, the sending module and the receiving module may be integrated into one module, for example, a transceiver module. The transceiver module is configured to implement a sending function and a receiving function of the communication apparatus according to the eighth aspect.

Optionally, the communication apparatus according to the eighth aspect may further include a processing module. The processing module is configured to implement a processing function of the communication apparatus according to the eighth aspect.

Optionally, the communication apparatus according to the eighth aspect may further include a storage module. The storage module stores a program or instructions. When the processing module executes the program or the instructions, the communication apparatus is enabled to perform the communication method according to the third aspect.

It should be noted that the communication apparatus according to the eighth aspect may be a terminal device, or may be a chip (system) or another component or assembly that may be disposed in a terminal device, or may be an apparatus including a terminal device. This is not limited in this application.

According to a ninth aspect, a communication apparatus is provided, where the apparatus includes a receiving module and a processing module; the receiving module is configured to receive a first request message from a first access network device, where the first request message is used to request a core network device to release a non-access stratum NAS context of a terminal device, and the first request message includes small data transmission SDT failure information; and the processing module is configured to release the NAS context of the terminal device based on the SDT failure information.

Optionally, the apparatus further includes a sending module; and the sending module is configured to send an acknowledgment message to the first access network device, where the acknowledgment message indicates that the core network device has completed release of the NAS context of the terminal device.

Optionally, the sending module and the receiving module may be integrated into one module, for example, a transceiver module. The transceiver module is configured to implement a sending function and a receiving function of the communication apparatus according to the ninth aspect.

Optionally, the communication apparatus according to the ninth aspect may further include a storage module. The storage module stores a program or instructions. When the processing module executes the program or the instructions, the communication apparatus is enabled to perform the communication method according to the fourth aspect.

It should be noted that the communication apparatus according to the ninth aspect may be a core network device, for example, an access and mobility management function (access and mobility management function, AMF), or may be a chip (system) or another component or assembly that may be disposed in a core network device, or may be an apparatus including a core network device. This is not limited in this application.

In addition, for technical effect of the communication apparatuses according to the sixth aspect to the ninth aspect, refer to the technical effect of the communication method according to the first aspect. Details are not described herein again.

According to a tenth aspect, a communication apparatus is provided, where the apparatus includes a processing module; the processing module is configured to obtain small data transmission SDT failure information; and the processing module is further configured to determine SDT configuration information based on the SDT failure information, where the SDT configuration information includes one or more of the following: a second SDT duration threshold, a second threshold for a quantity of RLC retransmissions, a second cell reselection threshold, or a second threshold for a quantity of retransmissions of a random access preamble. The second SDT duration threshold is greater than a first SDT duration threshold, the second threshold for the quantity of RLC retransmissions of the SDT data is greater than a first threshold for the quantity of RLC retransmissions of the SDT data, the second cell reselection threshold is greater than a first cell reselection threshold, and the second threshold for the quantity of retransmissions of the random access preamble is greater than a first threshold for the quantity of retransmissions of the random access preamble. The first SDT duration threshold, the first threshold for the quantity of RLC retransmissions of the SDT data, the first cell reselection threshold, or the first threshold for the quantity of retransmissions of the random access preamble is used to determine the SDT failure information.

In a possible design solution, the processing module is specifically configured to receive the SDT failure information from a third access network device.

Further, the SDT failure information includes one or more of the following: duration of an SDT process is greater than or equal to the first SDT duration threshold; or the quantity of radio link control RLC retransmissions of the SDT data reaches the first threshold for the quantity of RLC retransmissions of the SDT data; or a difference between quality of a signal received by the terminal device from the third access network device and quality of a signal received by the terminal device from the first access network device is greater than or equal to the first cell reselection threshold; or a quantity of retransmissions of the random access preamble reaches the first threshold for the quantity of retransmissions of the random access preamble; or an identifier of the first access network device; or an identifier of the terminal device.

Optionally, the communication apparatus according to the tenth aspect may further include a receiving module. The receiving module is configured to implement a receiving function of the communication apparatus according to the tenth aspect.

Optionally, the communication apparatus according to the tenth aspect may further include a sending module. The sending module is configured to implement a sending function of the communication apparatus according to the tenth aspect.

Optionally, the sending module and the receiving module may be integrated into one module, for example, a transceiver module. The transceiver module is configured to implement a sending function and a receiving function of the communication apparatus according to the tenth aspect.

Optionally, the communication apparatus according to the tenth aspect may further include a storage module. The storage module stores a program or instructions. When the processing module executes the program or the instructions, the communication apparatus is enabled to perform the communication method according to the fifth aspect.

It should be noted that the communication apparatus according to the tenth aspect may be an access network device, or may be a chip (system) or another component or assembly that may be disposed in an access network device, or may be an apparatus including an access network device. This is not limited in this application.

In addition, for technical effect of the communication apparatus according to the tenth aspect, refer to the technical effect of the communication method according to the fifth aspect. Details are not described herein again.

According to an eleventh aspect, a communication apparatus is provided, where the apparatus includes a processor, and the processor is coupled to a memory; and the processor is configured to execute a computer program stored in the memory, to enable the communication apparatus to perform the communication method according to any one of the first aspect to the fifth aspect.

In a possible design solution, the communication apparatus according to the eleventh aspect may further include a transceiver. The transceiver may be a transceiver circuit or an interface circuit. The transceiver may be used by the communication apparatus according to the eleventh aspect to communicate with another communication apparatus.

It should be noted that the communication apparatus according to the eleventh aspect may be the access network device according to any one of the first aspect, the second aspect, or the fifth aspect, the terminal device according to the third aspect, or the core network device according to the fourth aspect, may be a chip (system) or another component or assembly that may be disposed in an access network device, a terminal device, or a core network device, or may be an apparatus including an access network device, a terminal device, or a core network device. This is not limited in this application.

In addition, for technical effect of the communication apparatus according to the eleventh aspect, refer to the technical effect of the communication methods according to the first aspect to the fifth aspect. Details are not described herein again.

According to a twelfth aspect, a communication system is provided. The communication system includes one or more terminal devices, one or more access network devices, and one or more core network devices.

According to a thirteenth aspect, a computer-readable storage medium is provided, where the computer-readable storage medium stores a computer program or instructions, and when the computer program or the instructions are run on a computer, the computer is enabled to perform the communication methods according to any one of the first aspect to the fifth aspect.

According to a fourteenth aspect, a computer program product is provided, where the computer program product includes a computer program or instructions, and when the computer program or the instructions are run on a computer, the computer is enabled to perform the communication methods according to the first aspect to the fifth aspect.

DETAILED DESCRIPTION OF ILLUSTRATIVE EMBODIMENTS

The following describes technical solutions of this application with reference to the accompanying drawings.

The technical solutions in embodiments of this application may be applied to various communication systems, for example, a wireless fidelity (Wi-Fi) system, a vehicle to everything (V2X) communication system, a device-to-device (D2D) communication system, an internet of vehicles communication system, 4th generation (4G) mobile communication systems such as a long term evolution (LTE) system and a worldwide interoperability for microwave access (WiMAX) communication system, 5th generation (5G) mobile communication systems such as a new radio (NR) system, and next generation communication systems such as a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as “example” and “for example” are used to represent giving an example, an illustration, or a description. Any embodiment or design scheme described as an “example” in this application should not be explained as being more preferred or having more advantages than another embodiment or design scheme. Exactly, the term “example” is used to present a concept in a specific manner.

In embodiments of this application, terms “information”, “signal”, “message”, “channel”, and “signaling” may sometimes be interchangeably used. It should be noted that meanings expressed by the terms are consistent when differences of the terms are not emphasized. Terms “of” and “corresponding (corresponding and relevant)” may be interchangeably used sometimes. It should be noted that meanings expressed by the terms are consistent when differences of the terms are not emphasized.

In embodiments of this application, sometimes a word, such as $W_1$, including a subscript may be written in an incorrect form such as W1. Expressed meanings are consistent when differences are not emphasized.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that with the evolution of the network architecture and the emergence of new service scenarios, the technical solutions provided in embodiments of this application are still applicable to similar technical problems.

Figure 1:
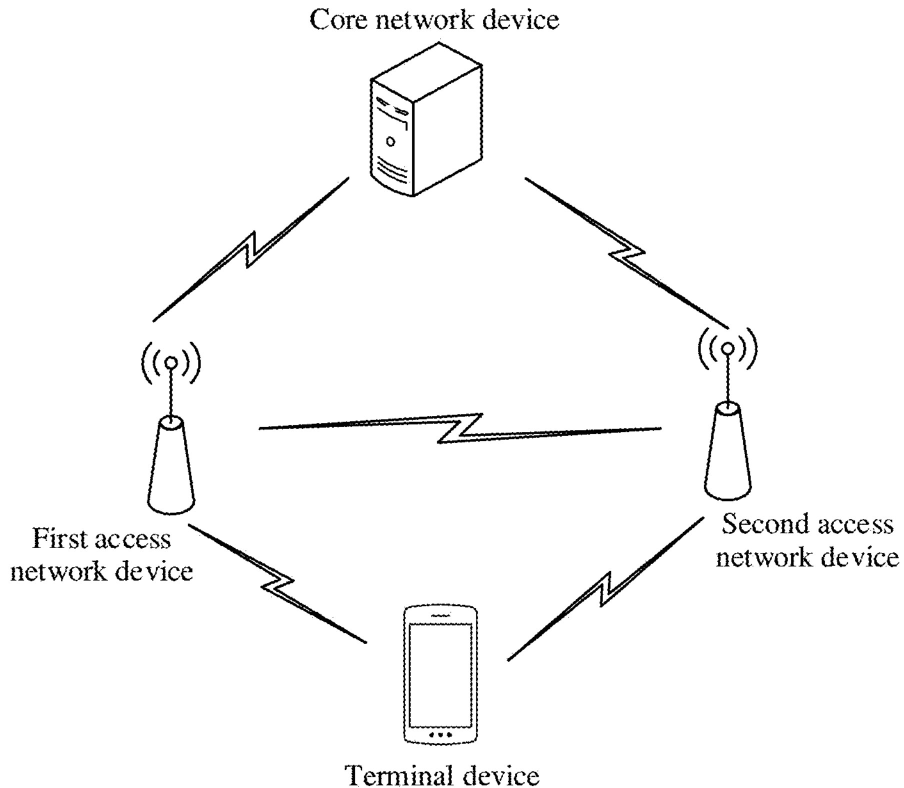
FIG. 1 is a diagram of an architecture of a communication system according to an embodiment of this application.

For ease of understanding embodiments of this application, a communication system shown in FIG. 1 is first used as an example to describe in detail a communication system applicable to embodiments of this application. For example, FIG. 1 is a diagram of an architecture of a communication system to which a communication method according to embodiments of this application is applicable.

As shown in FIG. 1, the communication system includes a terminal device, a first access network device, a second access network device, and a core network device. The first access network device is connected to the second access network device, and the first access network device and the second access network device may perform data transmission. The first access network device may provide a radio access service for the terminal device, and the second access network device may also provide a radio access service for the terminal device. The core network device may establish a connection to the terminal device to perform data transmission, or may connect to the first access network device or the second access network device to perform data transmission.

Specifically, the first access network device and the second access network device each correspond to one coverage area. The terminal device enters a coverage area of a corresponding access network device, and may receive a radio access service from the access network device. For example, the terminal device may send uplink data to the first access network device, and the first access network device may send downlink data to the terminal device.

It should be noted that the first access network device may communicate with the second access network device, and the second access network device may be or may not be a neighboring device of the first access network device. This is not limited in this embodiment of this application.

When the terminal device moves out of a coverage area of the first access network device and enters a coverage area of the second access network device, the terminal device reselects the second access network device from the first access network device to perform data transmission. In this case, the first access network device may be a previous service device of the terminal device, and the second access network device may be a target service device after cell reselection of the terminal device. For example, if the access network device is a base station, the first access network device may be a previous service base station of the terminal device, and the second access network device is a target service base station after cell reselection of the terminal device. In other words, in this case, an anchor base station of the terminal device changes from the previous service base station to the target service base station, and anchor relocation occurs (with anchor relocation).

Figure 2:
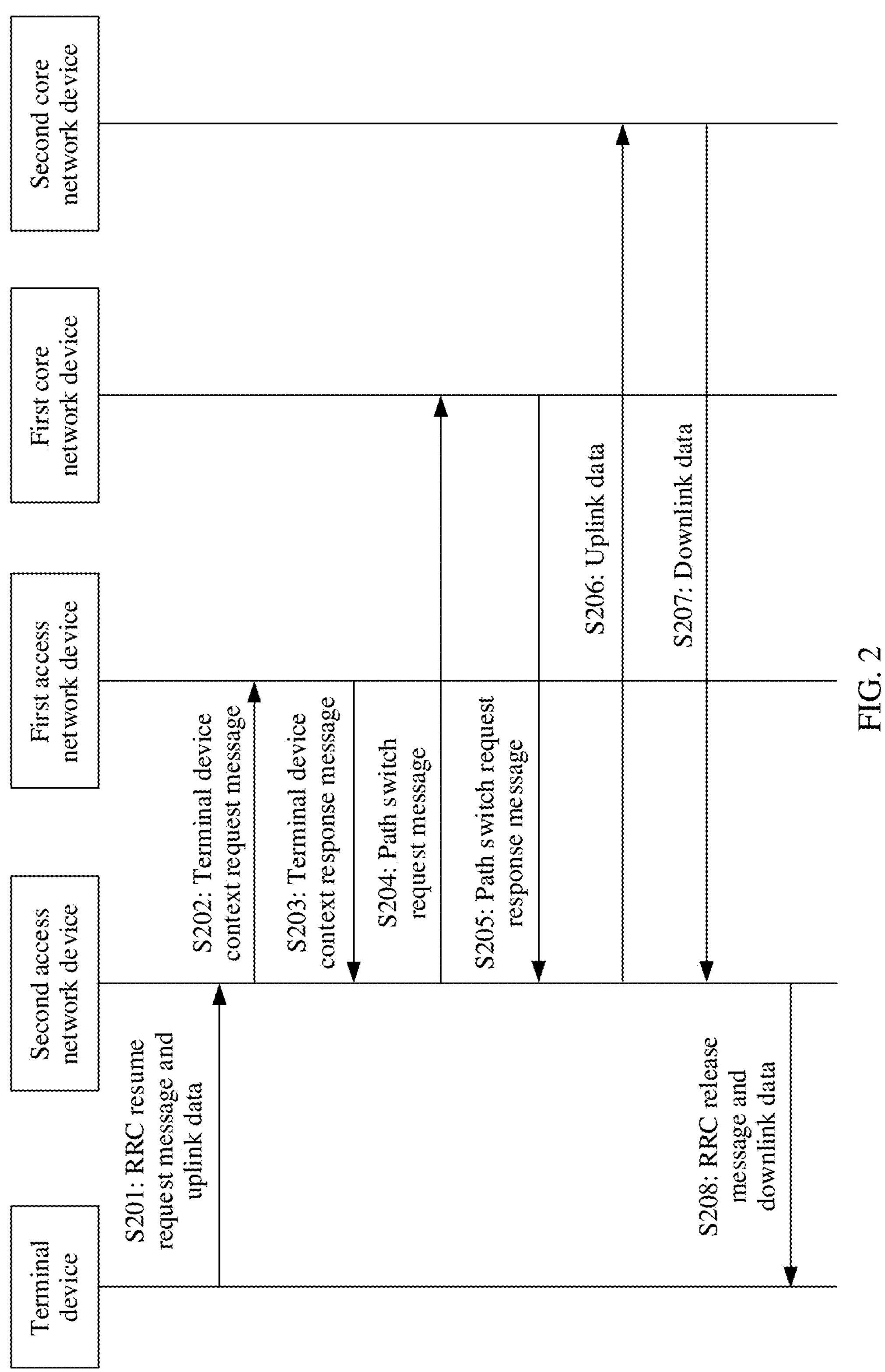
FIG. 2 is a schematic flowchart of SDT transmission with anchor relocation according to an embodiment of this application.

For example, FIG. 2 shows a schematic flowchart of SDT performed by a terminal device in an RRC inactive state with anchor relocation. The method specifically includes the following steps.

S201: The terminal device sends an RRC resume request message and uplink data to a second access network device.

The uplink data is SDT data. The terminal device may encapsulate the uplink data in an RRC resume request (RRC Resume Request) message for sending, or may multiplex the uplink data and the RRC resume request in one message for sending. The RRC resume request message carries an inactive-radio network temporary identifier (I-RNTI), and the I-RNTI is used to identify the terminal device in the RRC inactive state. In this case, the second access network device is used as a target service device after cell reselection of the terminal device.

S202: The second access network device sends a terminal device context request message to a first access network device.

The first access network device may be a previous service device. The terminal device context request (RETRIEVE UE CONTEXT REQUEST) message includes the I-RNTI. The first access network device determines an AS context of the terminal device based on the I-RNTI, where the AS context includes packet data convergence protocol (PDCP) configuration information, SDAP configuration information, radio link control (RLC) configuration information, AS security configuration information, and the like.

S203: The first access network device sends a terminal device context response message to the second access network device.

The terminal device context response (RETRIEVE UE CONTEXT RESPONSE) message includes the access stratum (AS) context in S202. In other words, the second access network device obtains the context of the terminal device, anchor relocation occurs, and a current service device of the terminal device is updated from the first access network device to the second access network device.

S204: The second access network device sends a path switch request message to a first core network device.

The path switch request (PATH SWITCH REQUEST) message is used to switch a connection between the first access network device and the first core network device to a connection between the second access network device and the first core network device. The first core network device may be an AMF network element.

S205: The first core network device sends a path switch request response message to the second access network device.

The path switch request response (PATH SWITCH REQUEST RESPONSE) message indicates that path switch is completed.

S206: The second access network device sends the uplink data to a second core network device.

The second core network device may be a UPF network element, and is configured to complete exchange of user plane data.

S207: The second access network device receives downlink data from the second core network device.

In other words, data exchange between the terminal device and the second core network device is converted to be performed by the second access network device.

S208: The second access network device sends an RRC release message and the downlink data to the terminal device.

The downlink data may alternatively be SDT data, and the RRC release (RRC Release) message is used to terminate an SDT process.

In some embodiments, similarly, the access network device is a base station, the first access network device may be a previous service base station of the terminal device, and the second access network device may be a target service base station after cell reselection of the terminal device. When the terminal device does not leave a coverage area of the first access network device, that is, the terminal device does not establish a connection to the second access network device, the current service device of the terminal device is still the first access network device. In other words, in this case, the anchor base station of the terminal device is still the previous service base station, and anchor relocation does not occur (without anchor relocation).

Figure 3:
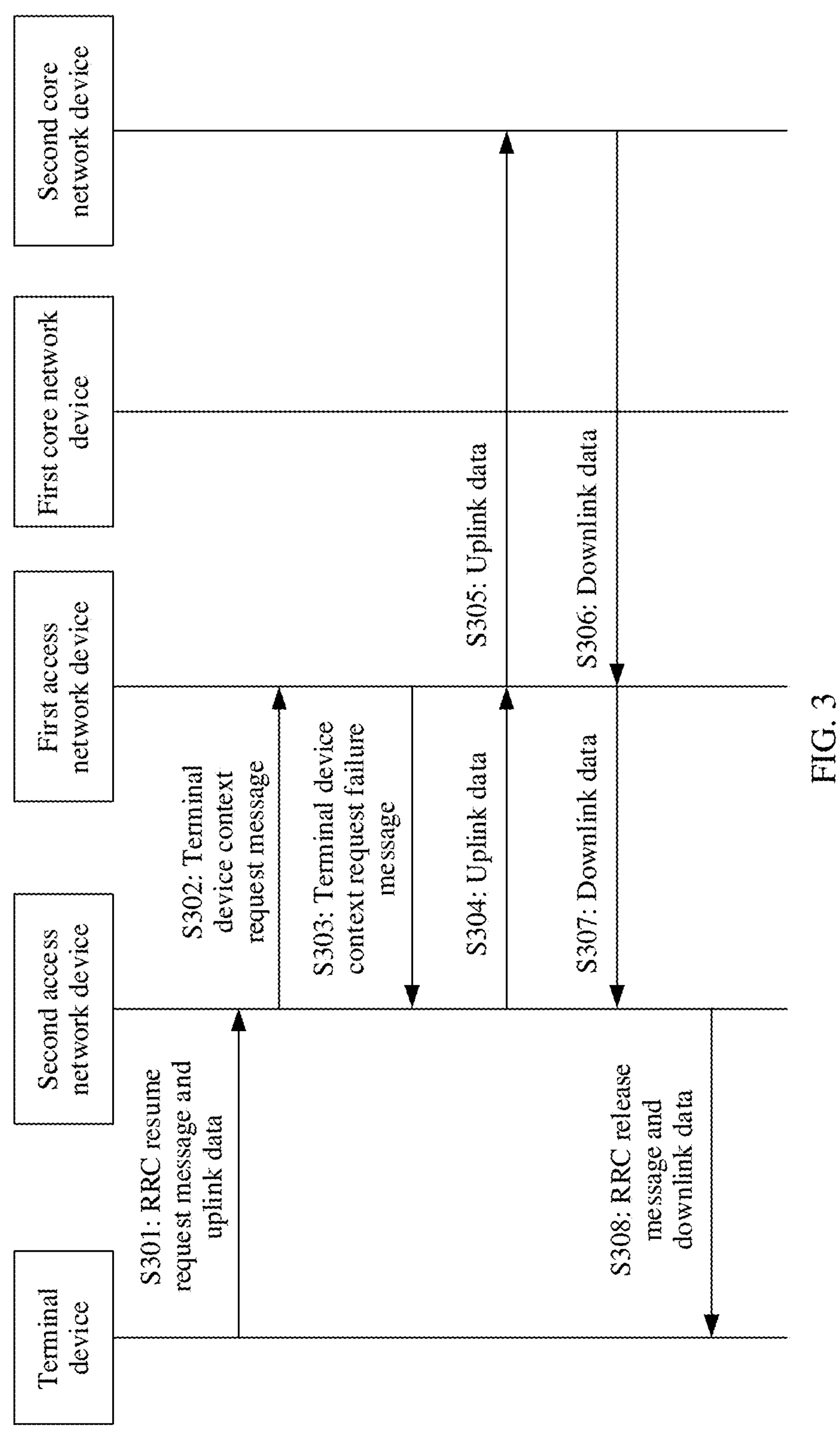
FIG. 3 is a schematic flowchart of SDT transmission without anchor relocation according to an embodiment of this application.

For example, FIG. 3 shows a schematic flowchart of SDT performed by a terminal device in an RRC inactive state without anchor relocation. The method specifically includes the following steps.

S301: The terminal device sends an RRC resume request message and uplink data to a second access network device. For details, refer to S201.

S302: The second access network device sends a terminal device context request message to a first access network device. For details, refer to step S202.

S303: The first access network device sends a terminal device context request failure message to the second access network device.

The terminal device context request failure (RETRIEVE UE CONTEXT REQUEST Failure) message indicates that anchor relocation does not occur, and a context of the terminal device is still stored in the first access network device.

S304: The second access network device sends the uplink data to the first access network device.

S305: The first access network device sends the uplink data to a second core network device.

S306: The second core network device sends downlink data to the first access network device.

S307: The first access network device sends the downlink data to the second access network device again.

S308: The second access network device sends an RRC release message and downlink data to the terminal device.

Steps S304 to S308 indicate that data exchange between the terminal device and the core network device is still performed by the first access network device, and the second access network device is configured to forward data. The RRC release message is used to terminate an SDT process.

It can be learned from S201 to S208 and S301 to S308 that the terminal device performs the SDT process in the RRC inactive state, and does not need to switch from the RRC inactive state to an RRC connected state, thereby reducing an instruction interaction process and improving data transmission efficiency.

In the foregoing two SDT processes, the terminal device may determine whether SDT is successful. When SDT fails, the terminal device enters an RRC idle state from the RRC inactive state, and releases the context of the terminal device.

The terminal device is a terminal that accesses the communication system and that has wireless sending and receiving functions, or a chip or a chip system that may be arranged in the terminal. The terminal device may also be referred to as a user apparatus, an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone, a tablet computer (Pad), a computer that has a wireless transceiver function, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, an in-vehicle terminal, an RSU that has a terminal function, or the like. The terminal device in this application may alternatively be a vehicle-mounted module, a vehicle-mounted assembly, a vehicle-mounted component, a vehicle-mounted chip, or a vehicle-mounted unit that is built in a vehicle as one or more components or units. The vehicle may implement the communication method in this application by using the vehicle-mounted module, the vehicle-mounted assembly, the vehicle-mounted component, the vehicle-mounted chip, or the vehicle-mounted unit that is built in the vehicle.

The first access network device and the second access network device may be collectively referred to as network devices. The network device is a device that is located on a network side of the communication system and has a wireless transceiver function, or a chip or a chip system that may be disposed in the device. The access network device includes but is not limited to an access point (AP), for example, a home gateway, a router, a server, a switch, or a bridge, an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), a wireless relay node, a wireless backhaul node, or a transmission and reception point (TRP, or transmission point, TP) in a wireless fidelity (Wi-Fi) system; or may be a gNB or a transmission point (TRP or TP) in a 5G system, for example, a new radio (NR) system, one or a group of antenna panels (including a plurality of antenna panels) of a base station in a 5G system, or may be a network node constituting a gNB or a transmission point, for example, a baseband unit (BBU), a central unit (CU), and/or a distributed unit (DU), or a road side unit (RSU) having a base station function, or the like.

In a possible design solution, the first access network device and/or the second access network device may be in a CU-DU split architecture. In other words, the first access network device and/or the second access network device may include one CU and one or more DUs. The CU is mainly responsible for centralized management and control of radio resources and connections, and has a wireless higher layer protocol stack function, for example, a PDCP layer function and a service data adaptation protocol (SDAP) layer function. The DU has a distributed user plane processing function, and mainly has a physical layer function and a layer-2 function having a high real-time requirement. For example, the DU has a physical layer (PHY) function, a media access control (MAC) layer function, and a radio link control (RLC) layer function.

Figure 4:
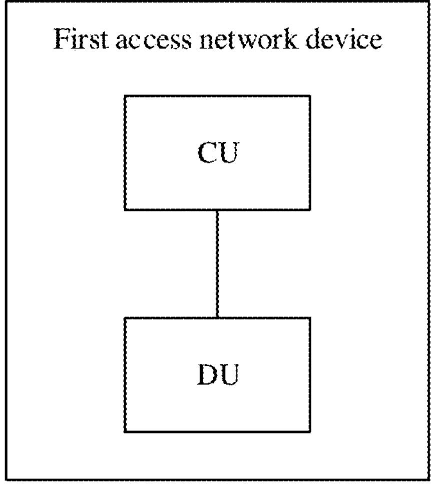
FIG. 4 is a diagram of an architecture of a first access network device according to an embodiment of this application.

For example, FIG. 4 is a diagram of a structure of a CU-DU split architecture of a first access network device. The first access network device includes a CU and a DU. The DU may be connected to a terminal device, the CU may be connected to a second access network device, and the CU may be further connected to a core network device. It should be understood that the first access network device may include a plurality of DUs, and the plurality of DUs are connected to CUs. In a specific implementation process, quantities of the CUs and the DUs may be determined based on a specific requirement. In addition, the CU and the DU may be deployed in a same device, or may be deployed in different devices. This is not limited in this embodiment of this application.

The core network device may be an AMF network element, and is mainly responsible for mobility management in a wireless network, for example, user location update, user registration with a network, and cell handover. Alternatively, the core network device may be a user plane function (UPF) network element, and is mainly responsible for forwarding and receiving user data.

It should be noted that the communication method provided in this embodiment of this application is applicable to communication between the terminal device, the first access network device, the second access network device, and the core network device shown in FIG. 1. For specific implementation, refer to the following method embodiments. Details are not described herein again.

It should be noted that the solutions in embodiments of this application may further be used in another communication system, and a corresponding name may alternatively be replaced with a name of a corresponding function in the another communication system.

It should be understood that FIG. 1 is merely a simplified diagram of an example for ease of understanding. The communication system may further include another network device and/or another terminal device that are/is not shown in FIG. 1.

When communicating with a network side device, the terminal device detects that SDT fails, and releases a context in time, to enter an RRC inactive state. However, the network side device does not know that SDT fails, and cannot release the context of the terminal device in time. Therefore, an embodiment of this application provides a communication method, used by a network side to release a context of a terminal device. With reference to FIG. 5 to FIG. 10, the following describes in detail the communication method provided in embodiments of this application.

It should be noted that names of messages between network elements, names of parameters in the messages, or the like in the following embodiments of this application are merely examples, and there may be other names in a specific implementation. This is not specifically limited in embodiments of this application.

It should be noted that, in descriptions of this application, words such as "first" or "second" are merely used for distinction and description, and shall not be understood as an indication or implication of relative importance or an indication or implication of an order. In this application, for network devices with different numbers, such as "a first access network device", the numbers are merely used for context description convenience, and different sequence numbers do not have specific technical meanings. For example, the first access network device or a second access network device may be understood as one or any one of a series of network devices. It may be understood that, during specific implementation, network devices with different numbers may alternatively be network devices of a same type. This is not limited in this application.

It may be understood that, in embodiments of this application, the first access network device, the second access network device, a distributed unit, or a central unit may perform a part or all of steps in embodiments of this application. The steps are merely examples. In embodiments of this application, other steps or variants of various steps may alternatively be performed. In addition, the steps may be performed in a sequence different from a sequence presented in embodiments of this application, and not all the steps in embodiments of this application need to be performed.

Figure 5:
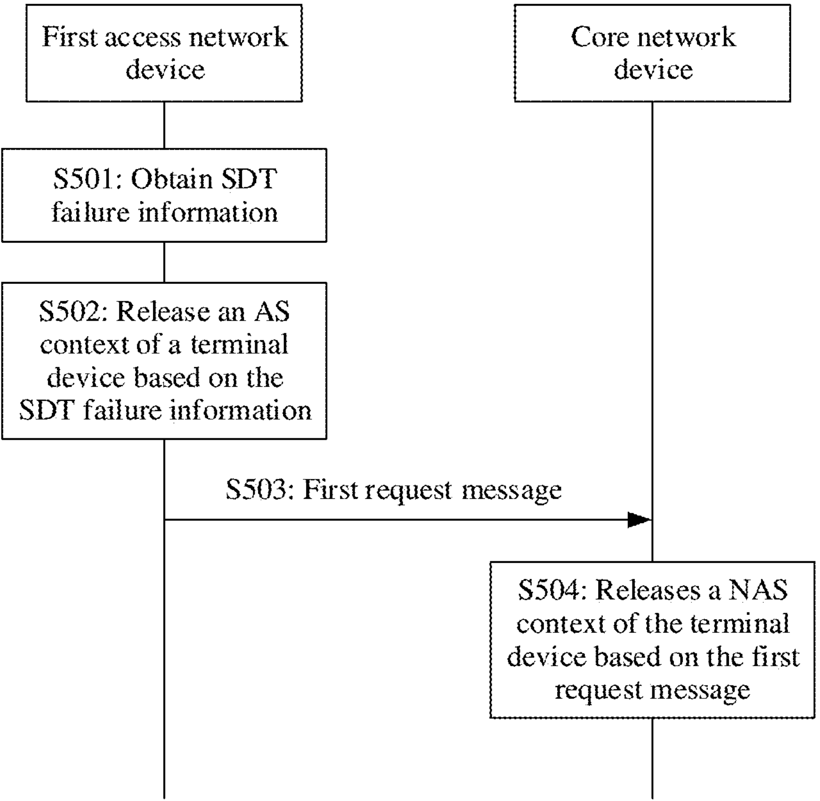
FIG. 5 is a schematic flowchart 1 of a communication method according to an embodiment of this application.

FIG. 5 is a schematic flowchart 1 of a communication method according to an embodiment of this application. The method is applicable to communication between the terminal device, the first access network device, the second access network device, and the core network device shown in FIG. 1. As shown in FIG. 5, the communication method includes the following steps.

S501: The first access network device obtains SDT failure information.

Specifically, the SDT failure information includes that duration of an SDT process between the terminal device and a network device is greater than or equal to a first SDT duration threshold, and/or that a quantity of radio link control RLC retransmissions of SDT data reaches a first threshold for the quantity of RLC retransmissions of the SDT data. The SDT failure information indicates that SDT of the terminal device fails.

The first SDT duration threshold may be maximum duration required by an SDT process. When duration of the SDT process is greater than or equal to the first SDT duration threshold, it indicates that the SDT process is not completed within a specified time.

In a possible design solution, the first access network device may obtain the SDT failure information by using the first access network device.

Specifically, the first access network device may include a distributed unit and a central unit. The distributed unit may be the DU shown in FIG. 4, and the central unit may be the CU shown in FIG. 4. In this embodiment, the DU is mainly responsible for function processing of an RLC layer, a MAC layer, and a PHY layer, and the CU is mainly responsible for function processing of a PDCP layer and an SDAP layer. It should be noted that division of functions of the DU and the CU may be set based on a requirement. This is not specifically limited in this embodiment of this application.

In a possible design solution, the first access network device obtains the SDT failure information by using the distributed unit. For a specific implementation process, refer to the following communication method shown in FIG. 6. Details are not described herein again.

In another possible design solution, the first access network device obtains the SDT failure information by using the central unit. For a specific implementation process, refer to the following communication method shown in FIG. 7. Details are not described herein again.

In still another possible implementation, the first access network device may obtain the SDT failure information from the second access network device. The second access network device may be a neighboring device of the first access network device.

Further, the second access network device may obtain the SDT failure information by using the second access network device or from the terminal device. For a specific implementation process, refer to the following communication method shown in FIG. 8 and FIG. 9. Details are not described herein again.

S502: The first access network device releases an AS context of the terminal device based on the SDT failure information.

Specifically, the first access network device obtains the SDT failure information, and determines that SDT fails, to release the AS context of the terminal device in a timely manner. The AS context of the terminal device may include at least one of the following: configured grant-small data transmission (CG-SDT) configuration information, configured scheduling-radio network temporary identifier (CS-RNTI) information, UE specific search space (USS) information, RLC configuration information, PDCP configuration information, SDAP configuration information, and AS security configuration information.

S503: The first access network device sends a first request message to a core network device.

The first request message includes the SDT failure information, and is used to notify the core network device that SDT fails, so that the core network device releases the NAS context of the terminal device. The core network device may be an AMF network element, and the AMF network element stores the NAS context of the terminal device.

S504: The core network device releases a non-access stratum (NAS) context of the terminal device based on the first request message.

The NAS context of the terminal device may include a NAS configuration and security information, for example, a NAS security key. After releasing the NAS context of the terminal device, the core network device determines that the terminal device enters a connected management idle (connected management IDLE, CM_IDLE) state, and the state is consistent with a state on a terminal device side.

Optionally, the communication method shown in FIG. 5 further includes: The core network device sends an acknowledgment message to the first access network device. The acknowledgment message indicates that the core network device has completed release of the NAS context of the terminal device.

The following uses a 5G system as an example to describe in detail a specific implementation of the communication method provided in embodiments of this application in the 5G system with reference to an SDT process.

Figure 6:
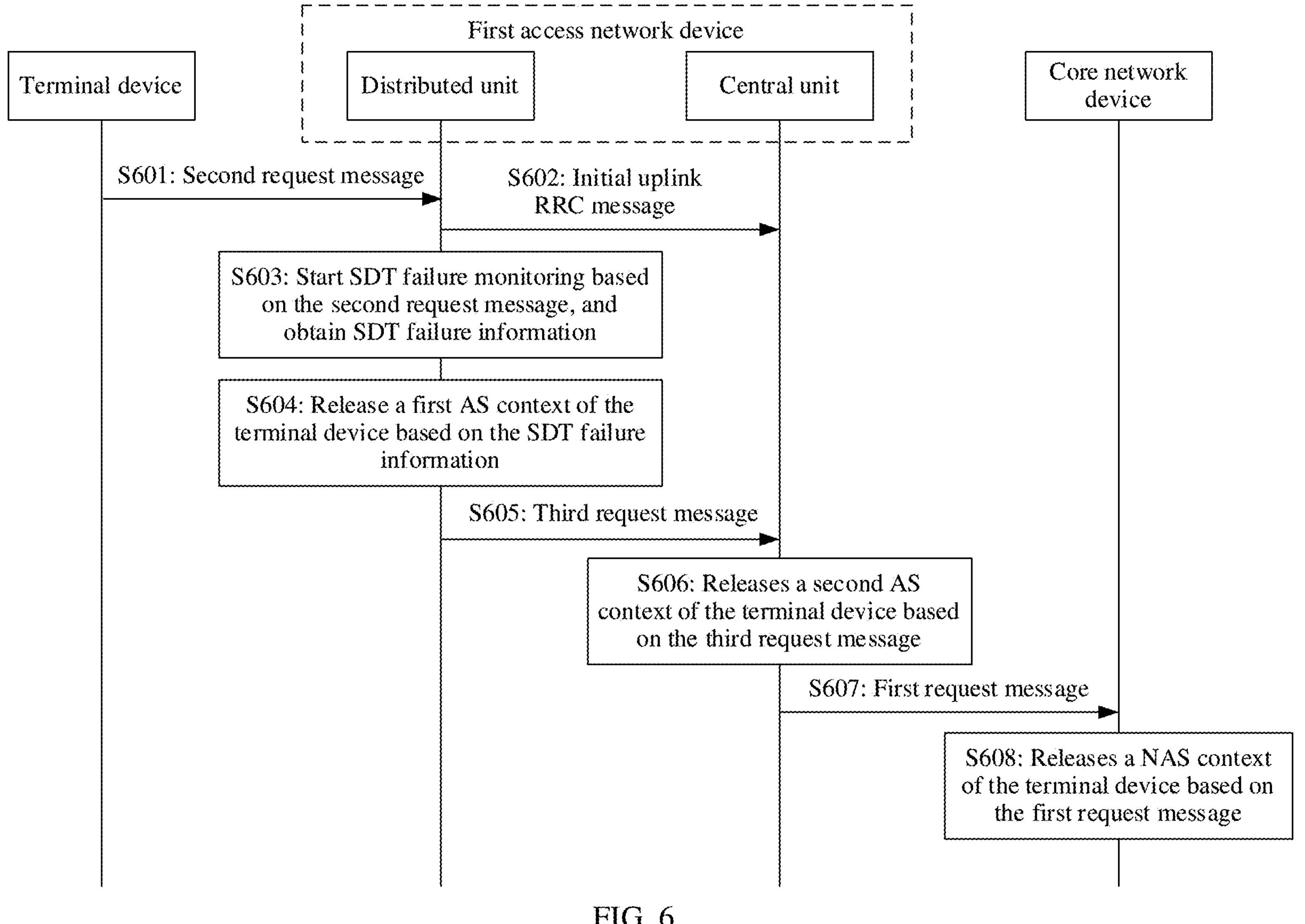
FIG. 6 is a schematic flowchart 2 of a communication method according to an embodiment of this application.

For example, FIG. 6 is a schematic flowchart 2 of a communication method according to an embodiment of this application. The communication method may be applied to the communication system shown in FIG. 1, to specifically implement the communication method shown in FIG. 5.

As shown in FIG. 6, the communication method includes the following steps.

S601: A terminal device sends a second request message to a distributed unit.

A first access network device uses the CU-DU split architecture shown in FIG. 4, and includes the distributed unit and a central unit. In other words, the distributed unit is a DU, and the central unit is a CU.

In this case, the terminal device is in an RRC inactive state, performs an SDT process, and starts SDT failure monitoring. If the terminal device detects that SDT fails, the terminal device releases a context, and enters an RRC idle state.

The second request message is used to request to resume an RRC connection, and the second request message may include the RRC resume request (RRC Resume Request) shown in FIG. 2 or FIG. 3. The terminal device may further send uplink data to the distributed unit, and the uplink data may be SDT data. The terminal device may multiplex the uplink SDT data and the second request message in one message, or encapsulate the uplink SDT data in the second request message. In other words, the second request message may include the SDT data.

Optionally, the second request message may further include an identifier of the terminal device, for example, the I-RNTI in step S201.

It may be understood that, if the uplink SDT data and the second request message are multiplexed in one message, the second request message is sent to the distributed unit after being processed at an RLC layer, a MAC layer, and a PHY layer.

Specifically, the terminal device may send the second request message based on a preconfigured CG-SDT resource, or may send the second request message by using a random access process, for example, a message 3 accompanying or included in a four-step random access process, or a message A accompanying or included in a two-step random access process.

S602: The distributed unit sends an initial uplink RRC message to the central unit.

The initial uplink RRC message includes the RRC resume request in the second request message. After receiving the initial uplink RRC message, the central unit sends a data forwarding tunnel to the distributed unit. The data forwarding tunnel is used by the distributed unit to send the uplink SDT data to the central unit.

It may be understood that the initial uplink RRC message and the SDT data that are sent by the distributed unit to the central unit are processed by using a PHY layer, a MAC layer, and an RLC layer of the distributed unit.

It should be noted that data sent through the data forwarding tunnel may be the uplink SDT data, or may be subsequent uplink SDT data sent by the terminal device. In other words, the distributed unit does not need to send the initial uplink RRC message to the central unit for sending of subsequent uplink SDT data.

S603: The distributed unit starts SDT failure monitoring based on the second request message, and obtains SDT failure information.

Specifically, an SDT failure monitoring mechanism is set in the distributed unit. The distributed unit may start SDT failure monitoring based on the RRC resume request in the second request message.

In a possible design solution, the distributed unit may monitor whether duration of the SDT process exceeds a first SDT duration threshold. Whether the duration of the SDT process exceeds the first SDT duration threshold may be determined by setting a timer in the distributed unit. Duration of the timer is the first SDT duration threshold. After receiving the RRC resume request of the terminal device, the distributed unit starts the timer. When the timer expires, it may be determined that SDT fails. Therefore, the SDT failure information obtained by the distributed unit is that the duration of the SDT process is greater than or equal to the first SDT duration threshold.

The first SDT duration threshold may be maximum duration required by the SDT process. When the duration of the SDT process is greater than or equal to the first SDT duration threshold, it indicates that the SDT process is not completed within a specified time, and SDT data transmission is abnormal. For example, if the distributed unit does not successfully receive, within a specified time, SDT data sent by the terminal device or does not successfully send an RRC release message, it is determined that SDT fails.

In another possible design solution, the distributed unit may determine whether a quantity of RLC retransmissions of the SDT data reaches a maximum quantity of RLC retransmissions, to be specific, whether the quantity of RLC retransmissions of the SDT data reaches a first threshold for the quantity of RLC retransmissions of the SDT data. Therefore, the SDT failure information obtained by the distributed unit is that the quantity of radio link control RLC retransmissions of the SDT data reaches the first threshold for the quantity of RLC retransmissions of the SDT data.

The SDT data may be uplink data, for example, the foregoing uplink SDT data and subsequent uplink SDT data. In other words, when a quantity of times for which the distributed unit sends a retransmission request for the uplink SDT data to the terminal device reaches a specified maximum quantity of RLC retransmissions, but the distributed unit still does not successfully receive the SDT data, it is determined that SDT fails. For example, the first threshold for the quantity of RLC retransmissions of the SDT data is set to eight. When the distributed unit sends the retransmission request for the uplink SDT data to the terminal device for eight times, but the distributed unit still does not successfully receive the SDT data, it is determined that SDT fails.

Optionally, the SDT data may alternatively be downlink data. In other words, when a quantity of RLC retransmissions for sending the downlink SDT data by the distributed unit to the terminal device reaches a specified maximum quantity of RLC retransmissions, but the distributed unit still does not receive an acknowledgment indicating that the SDT data is successfully received, it is determined that SDT fails.

For example, the first threshold for the quantity of RLC retransmissions of the SDT data is set to eight. When the quantity of RLC retransmissions of sending the downlink SDT data by the distributed unit reaches eight, but no response indicating that the terminal device successfully receives the SDT data is received, it is determined that SDT fails.

In still another possible design solution, the distributed unit may further monitor both the duration of the SDT process and the quantity of RLC retransmissions, to determine that SDT fails. A combination of the duration and the quantity of RLC retransmissions can avoid an SDT failure misjudgment, and improve reliability. The SDT duration threshold may be set to the same as the first SDT duration threshold, or may be different from the first SDT duration threshold. The SDT duration threshold is set based on a specific case. This is not limited in this application.

Optionally, the SDT failure information may further include the identifier (for example, an I-RNTI) of the terminal device and a cell identifier of the first access network device, and the cell identifier is an identifier of a cell receiving the RRC resume request.

S604: The distributed unit releases a first AS context of the terminal device based on the SDT failure information.

The first AS context is a part of an AS context that is of the terminal device and that is stored by the first access network device, and the AS context further includes a second AS context stored in the central unit that is described in the following. The first AS context may include CG-SDT configuration information, RLC configuration information, CS-RNTI information, USS information, and the like. The distributed unit releases the first AS context in a timely manner based on the SDT failure information, to avoid a resource waste.

S605: The distributed unit sends a third request message to the central unit.

The third request message includes the SDT failure information obtained by the distributed unit, and is used to request the central unit to release the second AS context of the terminal device that is stored in the central unit.

S606: The central unit releases the second AS context of the terminal device based on the third request message.

The central unit determines, based on the third request message, to release the second AS context of the terminal device, where the second AS context may include PDCP configuration information, SDAP configuration information, AS security configuration information, and the like.

S607: The central unit sends a first request message to a core network device.

The core network device may be an AMF network element, and the first request message includes the SDT failure information, and is used to request the core network device to release a NAS context of the terminal device.

S608: The core network device releases the NAS context of the terminal device based on the first request message.

For details, refer to step S504. Details are not described herein again.

Optionally, the core network device may further send an acknowledgment message to the central unit. The acknowledgment message indicates that the core network device has completed release of the NAS context of the terminal device.

Steps S601 to S608 are an interaction process in which the first access network device obtains the SDT failure information by using the distributed unit based on the split architecture, and completes release of the context of the terminal device. In addition, the first access network device may alternatively obtain the SDT failure information based on the central unit, to complete release of the context of the terminal device.

Figure 7:
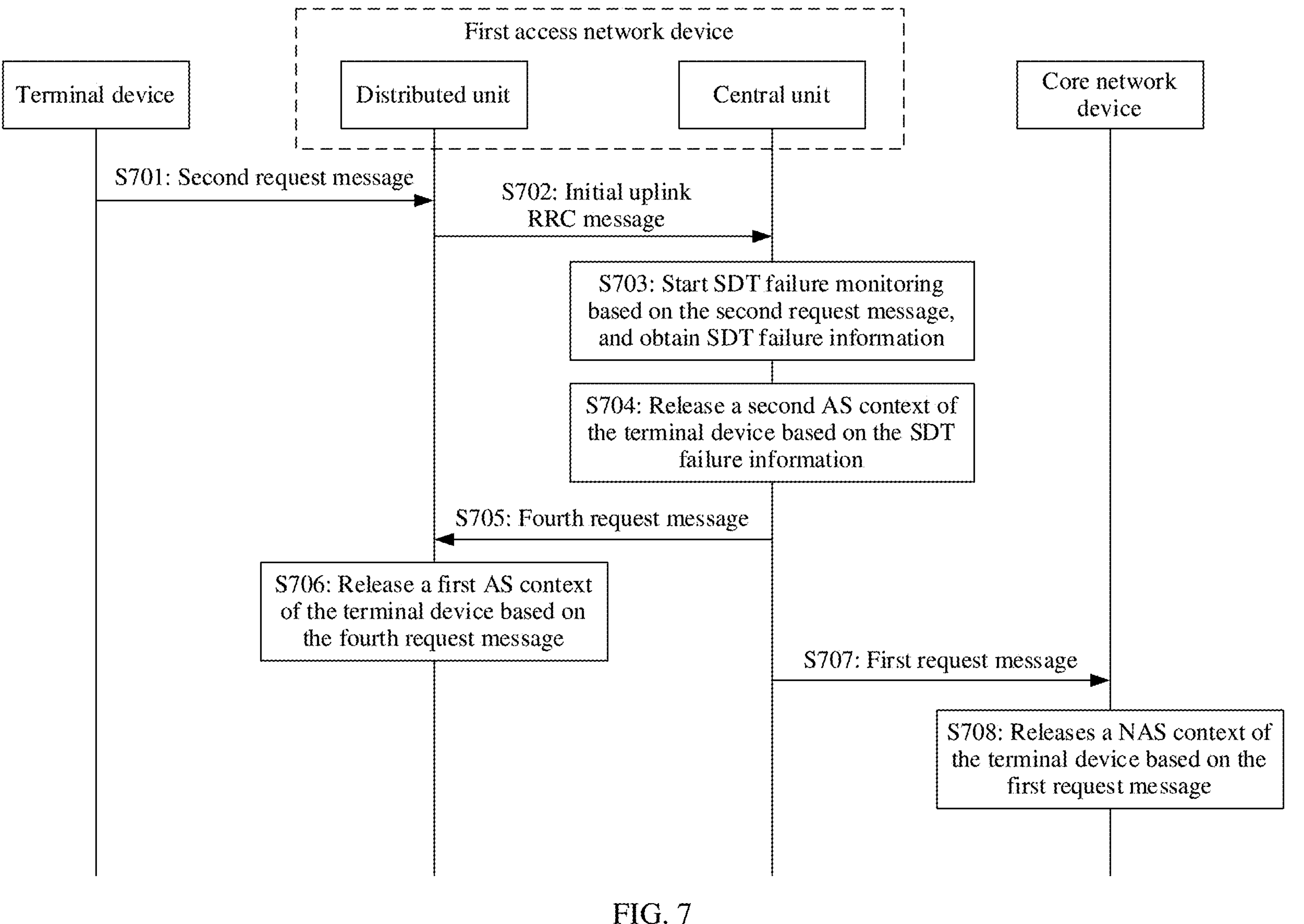
FIG. 7 is a schematic flowchart 3 of a communication method according to an embodiment of this application.

For example, FIG. 7 is a schematic flowchart 3 of a communication method according to an embodiment of this application. The communication method may be applied to the communication system shown in FIG. 1, to specifically implement the communication method shown in FIG. 5.

As shown in FIG. 7, the communication method includes the following steps.

S701: A terminal device sends a second request message to a distributed unit.

S702: The distributed unit sends an initial uplink RRC message to the central unit.

For a specific process of S701 and S702, refer to S601 and S602. Details are not described herein again.

S703: The central unit starts SDT failure monitoring based on the second request message, and obtains SDT failure information.

Specifically, an SDT failure monitoring mechanism is set in the central unit. The central unit may start SDT failure monitoring based on an RRC resume request in the second request message.

In a possible design solution, the central unit monitors whether duration of an SDT process exceeds a first SDT duration threshold. Whether the duration of the SDT process exceeds the first SDT duration threshold may be determined by setting a timer in the central unit. Duration of the timer is the first SDT duration threshold. After receiving the RRC resume request of the terminal device, the central unit starts the timer. When the timer expires, it may be determined that SDT fails. Therefore, the SDT failure information obtained by the central unit is that the duration of the SDT process is greater than or equal to the first SDT duration threshold.

The first SDT duration threshold may be maximum duration required by the SDT process. When the duration of the SDT process is greater than or equal to the first SDT duration threshold, it indicates that the SDT process is not completed within a specified time, and SDT data transmission is abnormal. For example, if the central unit does not successfully receive, within a specified time, SDT data sent by the terminal device or does not successfully send an RRC release message, it is determined that SDT fails.

It should be noted that when protocol layer division of the central unit and the distributed unit is different from that shown in FIG. 4, for example, the distributed unit is mainly responsible for function processing of a MAC layer and a PHY layer, and the central unit is mainly responsible for function processing of an RLC layer, a PDCP layer, and an SDAP layer, the central unit may still perform SDT failure monitoring by determining whether a quantity of RLC retransmissions of the SDT data reaches a maximum quantity of RLC retransmissions. For a specific process, refer to step S603. Details are not described herein again.

S704: The central unit releases a second AS context of the terminal device based on the SDT failure information.

S705: The central unit sends a fourth request message to the distributed unit.

The fourth request message includes the SDT failure information, and is used to request the distributed unit to release a first AS context of the terminal device.

S706: The distributed unit releases the first AS context of the terminal device based on the fourth request message.

S707: The central unit sends a first request message to a core network device.

Optionally, the first request message may alternatively be sent by the distributed unit to the core network device.

S708: The core network device releases a NAS context of the terminal device based on the first request message.

Specifically, for a specific process of S704 to S708, refer to S501 to S504 and/or S604 to S608.

Optionally, the core network device may further send an acknowledgment message to the central unit. The acknowledgment message indicates that the core network device has completed release of the NAS context of the terminal device.

FIG. 6 and FIG. 7 show a process of how a network side performs SDT failure monitoring and releases a context of a terminal device when the terminal device is in a coverage area of an access network device (a first access network device). In this embodiment of this application, release of the context of the terminal device of the first access network device may alternatively be based on the scenario shown in FIG. 3.

Figure 8:
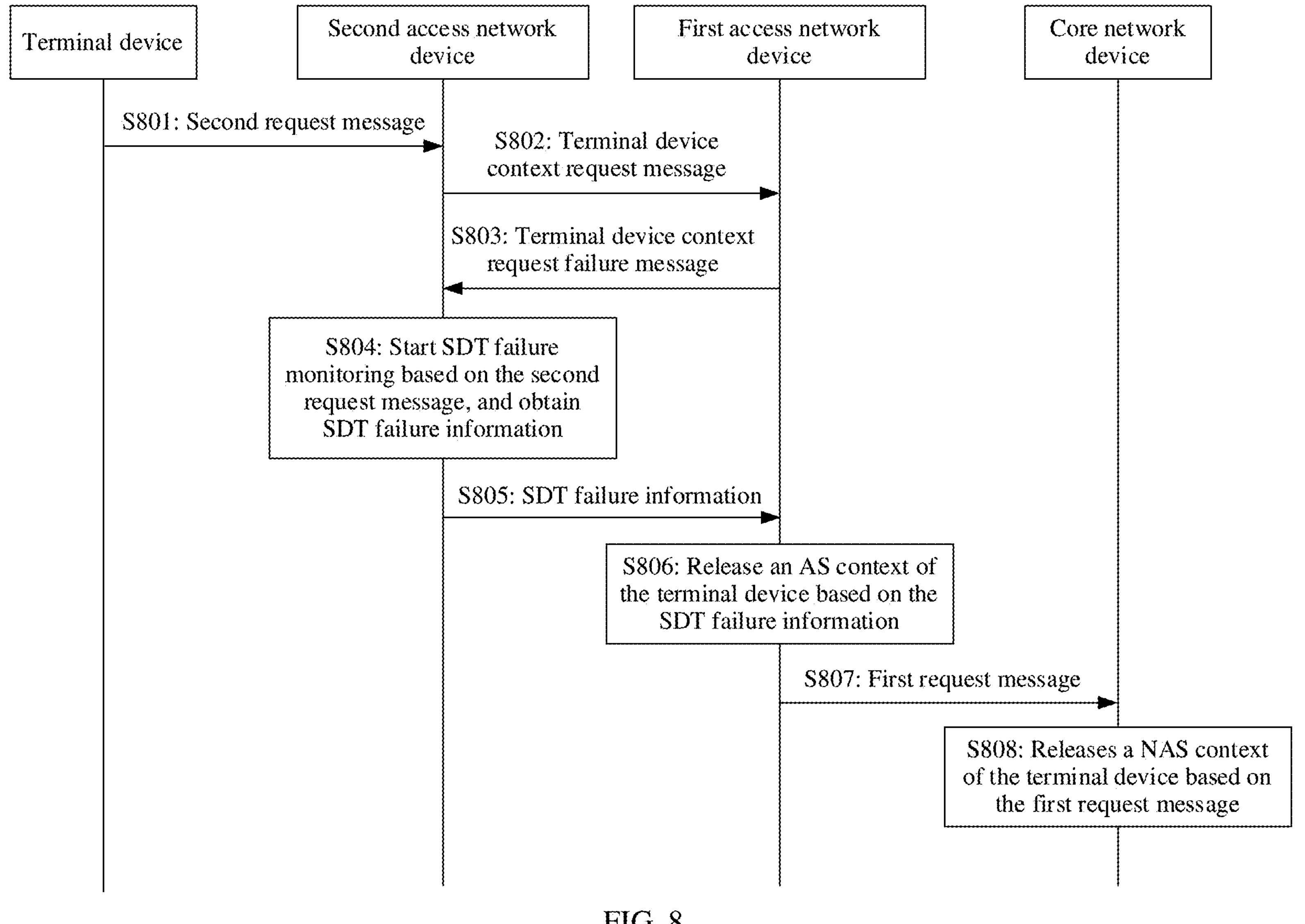
FIG. 8 is a schematic flowchart 4 of a communication method according to an embodiment of this application.

For example, FIG. 8 is a schematic flowchart 4 of a communication method according to an embodiment of this application. The communication method may be applied to the communication system shown in FIG. 1, to specifically implement the communication method shown in FIG. 5.

As shown in FIG. 8, the communication method includes the following steps.

S801: A terminal device sends a second request message to a second access network device.

For a description of the second request message, refer to S601. Details are not described herein again.

S802: The second access network device sends a terminal device context request message to a first access network device.

For a specific process of step S802, refer to S202.

S803: The first access network device sends a terminal device context request failure message to the second access network device.

The terminal device context request failure message (RETRIEVE UE CONTEXT REQUEST Failure) carries indication information of no anchor relocation, and further carries a part of a context of the terminal device, for example, RLC configuration information, which is temporarily used by the second access network device to perform SDT data transmission with the terminal device. It may be understood that an AS context of the terminal device is still stored in the first access network device.

S804: The second access network device starts SDT failure monitoring based on the second request message, and obtains SDT failure information.

Specifically, an SDT failure monitoring mechanism is set in the second access network device. The second access network device may start SDT failure monitoring based on an RRC resume request in the second request message.

Specifically, the second access network device may monitor whether duration of an SDT process expires, that is, whether the duration exceeds a first SDT duration threshold. Whether the duration of the SDT process exceeds the first SDT duration threshold may be determined by setting a timer in the second access network device. Duration of the timer is the first SDT duration threshold. After receiving the RRC resume request of the terminal device, the second access network device starts the timer. When the timer expires, it may be determined that SDT fails. Therefore, the SDT failure information obtained by the second access network device is that the duration of the SDT process is greater than or equal to the first SDT duration threshold.

The first SDT duration threshold may be maximum duration required by completing the SDT process. When the duration of the SDT process is greater than or equal to the first SDT duration threshold, it indicates that the SDT process is not completed within a specified time, and SDT data transmission is abnormal. For example, if the second access network device does not successfully receive, within a specified time, SDT data sent by the terminal device or does not successfully send an RRC release message, it is determined that SDT fails.

In another possible design solution, the second access network device may determine whether a quantity of RLC retransmissions of the SDT data reaches a maximum quantity of RLC retransmissions, to be specific, whether the quantity of RLC retransmissions of the SDT data reaches a first threshold for the quantity of RLC retransmissions of the SDT data. Therefore, the SDT failure information obtained by the second access network device is that the quantity of radio link control RLC retransmissions of the SDT data reaches the first threshold for the quantity of RLC retransmissions of the SDT data.

The SDT data may be uplink data, for example, the foregoing uplink SDT data and subsequent uplink SDT data. In other words, when a quantity of times for which the second access network device sends an uplink SDT data retransmission request to the terminal device reaches a specified maximum quantity of RLC retransmissions, but the second access network device still does not successfully receive the SDT data, it is determined that SDT fails. For example, the first threshold for the quantity of RLC retransmissions of the SDT data is set to eight. When the second access network device sends the retransmission request for the uplink SDT data to the terminal device for eight times, but the second access network device still does not successfully receive the SDT data, it indicates that SDT fails.

Optionally, the SDT data may alternatively be downlink data. In other words, when a quantity of RLC retransmissions for sending the downlink SDT data by the second access network device to the terminal device reaches a specified maximum quantity of RLC retransmissions, but the second access network device still does not receive an acknowledgment indicating that the SDT data is successfully received, it is determined that SDT fails. For example, the first threshold for the quantity of RLC retransmissions of the SDT data is set to eight. When the quantity of RLC retransmissions of sending the downlink SDT data by the second access network device reaches eight, but no response indicating that the terminal device successfully receives the SDT data is received, it is determined that SDT fails.

In still another possible design solution, the second access network device may further monitor both the duration of the SDT process and the quantity of RLC retransmissions, to determine that SDT fails. A combination of the duration and the quantity of RLC retransmissions can avoid an SDT failure misjudgment, and improve reliability. The SDT duration threshold may be set to the same as the first SDT duration threshold, or may be different from the first SDT duration threshold. The SDT duration threshold is set based on a specific case. This is not limited in this application.

In yet another possible design solution, the second access network device may alternatively obtain the SDT failure information based on a CU-DU split architecture. For a specific process, refer to S603 and S703. Details are not described herein again.

S805: The second access network device sends the SDT failure information to the first access network device.

Specifically, the second access network device may send the SDT failure information to the first access network device through an Xn interface.

S806: The first access network device releases the AS context of the terminal device based on the SDT failure information.

Optionally, S807: The first access network device sends a first request message to a core network device.

In a possible design solution, when the second access network device is connected to the core network device, the second access network may directly send the first request message to the core network device.

S808: The core network device releases a NAS context of the terminal device based on the first request message.

For a specific process of S806 to S808, refer to S502 to S504. Details are not described herein again.

Optionally, the core network device may send an acknowledgment message to the first access network device. The acknowledgment message indicates that the core network device has completed release of the NAS context of the terminal device.

In another possible implementation, the first access network device may alternatively obtain the SDT failure information from the terminal device. For example, FIG. 9 is a schematic flowchart 5 of a communication method according to an embodiment of this application.

Figure 9:
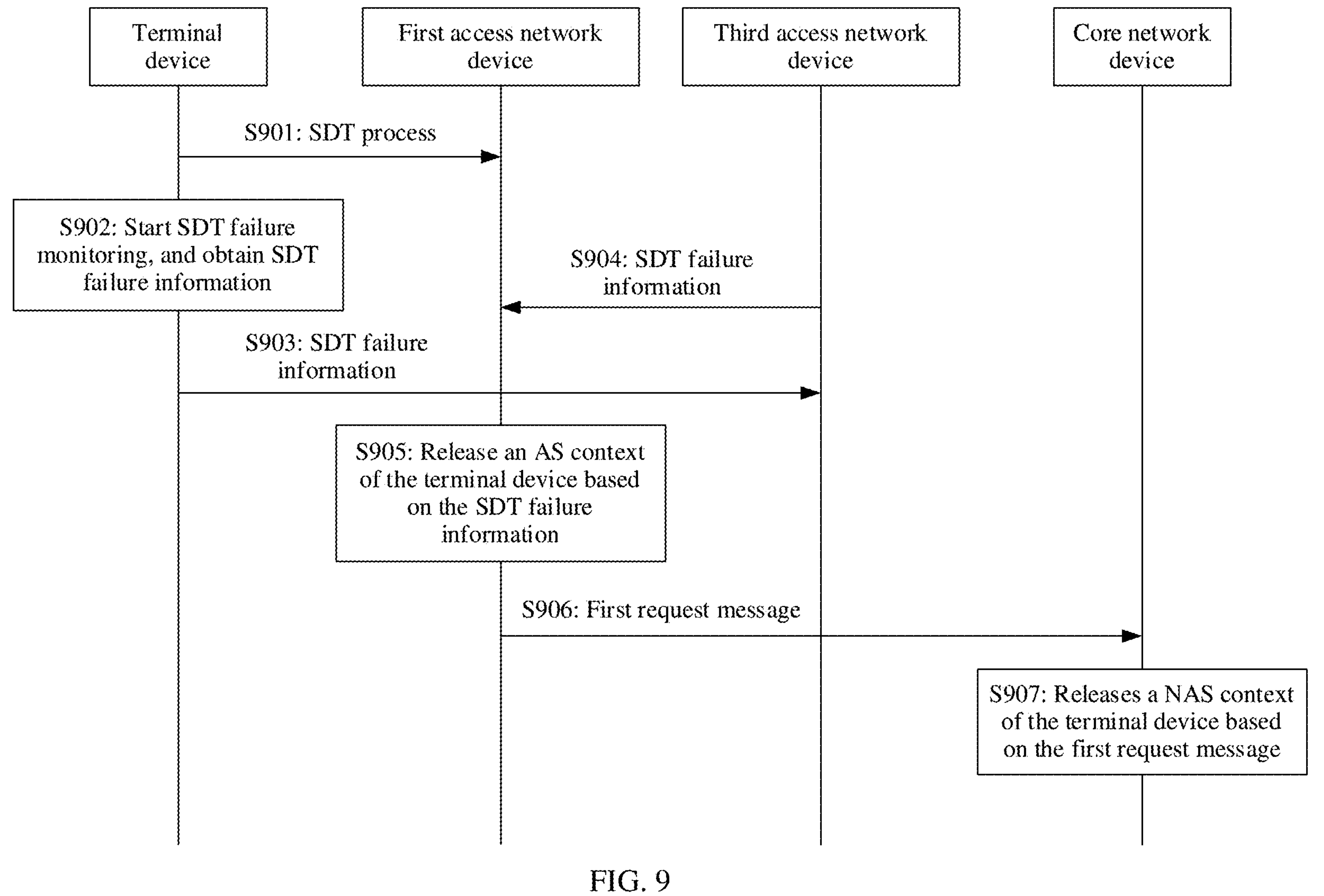
FIG. 9 is a schematic flowchart 5 of a communication method according to an embodiment of this application.

As shown in FIG. 9, the communication method includes the following steps.

S901: A terminal device initiates an SDT process to a first access network device.

For the SDT process, refer to the process shown in FIG. 6 or FIG. 7 in which the terminal device sends the RRC resume request and the uplink SDT data or the second request message to communicate with the first access network device. Details are not described herein again.

S902: The terminal device starts SDT failure monitoring, and obtains SDT failure information.

Specifically, the terminal device starts SDT failure monitoring when starting to perform SDT data transmission with the first access network device. For example, the terminal device monitors, based on a timing mechanism that is set, whether duration of the SDT process is greater than or equal to a first SDT duration threshold, or whether a quantity of RLC retransmissions of SDT data reaches a first threshold for the quantity of RLC retransmissions of the SDT data, or whether cell reselection occurs in the SDT process, or whether a quantity of retransmissions of a random access preamble in a random access process reaches a first threshold for the quantity of retransmissions of the random access preamble.

In other words, the terminal device determines that SDT fails, and the obtained SDT failure information may include: the duration of the SDT process is greater than or equal to the first SDT duration threshold (the SDT process times out), the quantity of radio link control RLC retransmissions of the SDT data reaches the first threshold for the quantity of RLC retransmissions of the SDT data (the quantity of RLC retransmissions of the SDT data reaches a maximum quantity), a difference between quality of a signal received by the terminal device from a third access network device and quality of a signal received by the terminal device from the first access network device (cell reselection occurs) is greater than or equal to a first cell reselection threshold, and the quantity of retransmissions of the random access preamble reaches the first threshold for the quantity of retransmissions of the random access preamble (the quantity of retransmissions of the random access preamble reaches a maximum retransmission quantity).

Optionally, the SDT failure information may further include a cell identifier of the first access network device and an identifier of the terminal device.

S903: The terminal device sends the SDT failure information to the third access network device.

The third access network device may be the second access network device in FIG. 1 to FIG. 3 and FIG. 8. In other words, the third access network device may be an access network device obtained after cell reselection of the terminal device, or may not be an access network device obtained after cell reselection of the terminal device.

Specifically, the terminal device establishes an RRC connection to the third access network device, switches from an RRC idle state to an RRC connected state, and then sends the SDT failure information to the first access network device. The SDT failure information may be sent in a form of a report.

In a possible design solution, the third access network device may alternatively be another access network device adjacent to the first access network device.

S904: The third access network device sends the SDT failure information to the first access network device.

S905: The first access network device releases an AS context of the terminal device based on the SDT failure information.

S906: The first access network device sends a first request message to a core network device.

S907: The core network device releases a NAS context of the terminal device based on the first request message.

For a specific process of S905 to S907, refer to S501 to S504. Details are not described herein again.

Based on the communication method shown in any one of FIG. 5 to FIG. 9, the first access network device may determine, by obtaining the SDT failure information, that SDT data transmission with the terminal device fails, to release the AS context of the terminal device in a timely manner based on the SDT failure information, and notify the core network device to release the NAS context of the terminal device in a timely manner, so that the terminal device, the first access network device, and the core network device release a context of the terminal device according to a same rule, and statuses of the terminal device that are recorded by the three devices are consistent. This avoids a case in which a network side device maintains an unnecessary context of the terminal device and occupies resources, thereby saving resources and improving resource utilization.

Further, based on the communication method shown in FIG. 9, in this embodiment of this application, SDT configuration information of the first access network device may be further optimized.

Figure 10:
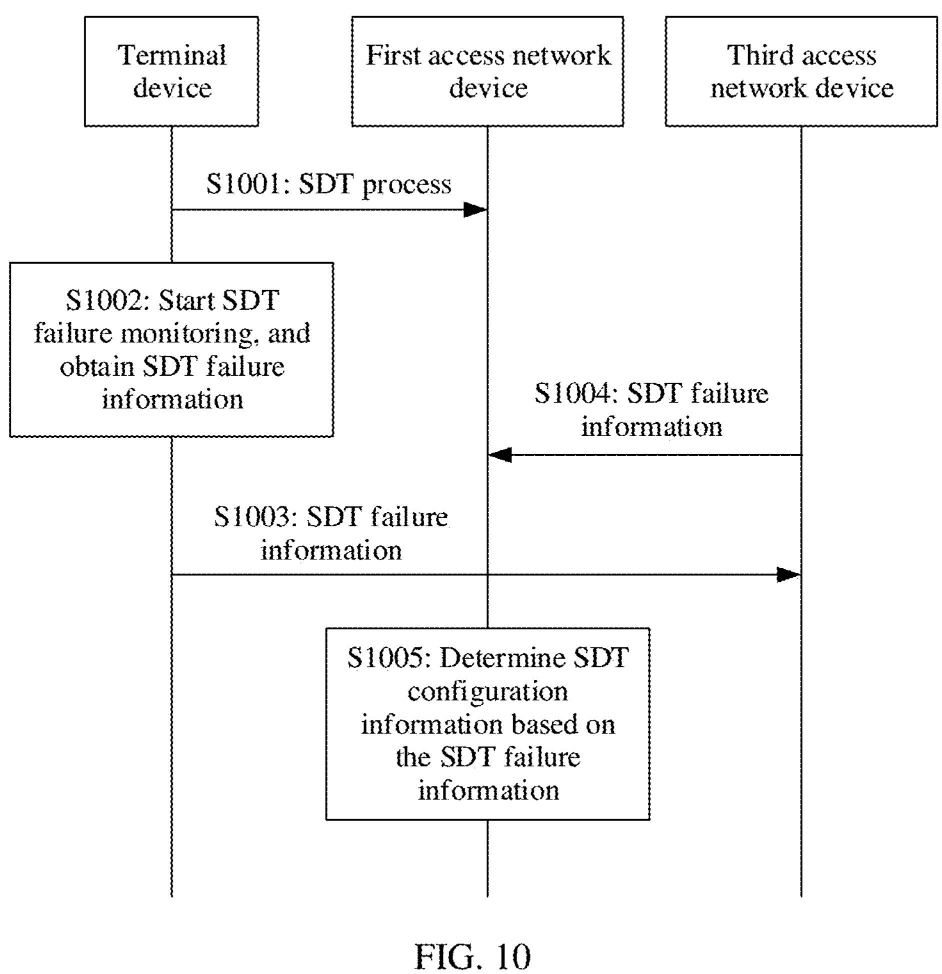
FIG. 10 is a schematic flowchart 6 of a communication method according to an embodiment of this application.

For example, FIG. 10 is a schematic flowchart 6 of a communication method according to an embodiment of this application. As shown in FIG. 10, the communication method includes the following steps.

S1001: A terminal device initiates an SDT process to a first access network device.

S1002: The terminal device starts SDT failure monitoring, and obtains SDT failure information.

S1003: The terminal device sends the SDT failure information to a third access network device.

S1004: The third access network device sends the SDT failure information to the first access network device.

For a specific process of S1001 to S1004, refer to S901 to S904.

S1005: The first access network device determines SDT configuration information based on the SDT failure information.

Specifically, the first access network device optimizes original SDT configuration information based on the SDT failure information. The original SDT configuration information may include a first SDT duration threshold, a first threshold for a quantity of RLC retransmissions of SDT data, a first cell reselection threshold, or a first threshold for a quantity of retransmissions of a random access preamble.

The optimized SDT configuration information may include a second SDT duration threshold, a second threshold for the quantity of RLC retransmissions, a second cell reselection threshold, and a second threshold for the quantity of retransmissions of the random access preamble. The second SDT duration threshold is greater than the first SDT duration threshold, the second threshold for the RLC retransmissions of the SDT data is greater than the first threshold for the RLC retransmissions of the SDT data, the second cell reselection threshold is greater than the first cell reselection threshold, and the second threshold for the quantity of retransmissions of the random access preamble is greater than the first threshold for the quantity of retransmissions of the random access preamble.

Based on the communication method shown in FIG. 10, the first access network device may optimize the SDT configuration information based on the exchanged SDT failure information, so that a specified threshold is increased. This prevents another terminal device from entering an RRC idle state too early when communicating with the first access network device, thereby avoiding an SDT data packet loss and improving data transmission reliability.

The foregoing describes in detail communication methods provided in embodiments of this application with reference to FIG. 5 to FIG. 10. The following describes in detail with reference to FIG. 11 to FIG. 16, a communication apparatus configured to perform the communication methods provided in embodiments of this application.

It should be noted that a "module" in this embodiment of this application may alternatively be a "unit". This is not limited herein.

Figure 11:
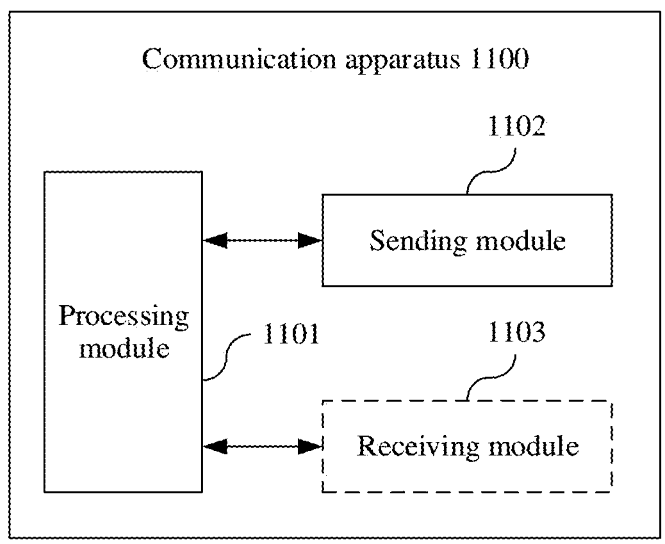
FIG. 11 is a diagram 1 of a structure of a communication apparatus according to an embodiment of this application.

For example, FIG. 11 is a diagram 1 of a structure of the communication apparatus according to an embodiment of this application. As shown in FIG. 11, a communication apparatus 1100 includes a processing module 1101 and a sending module 1102. For ease of description, FIG. 11 shows only main components of the communication apparatus.

In some embodiments, the communication apparatus 1100 may be applied to the communication system shown in FIG. 1, and perform functions of the first access network device in the communication methods shown in any one of FIG. 5 to FIG. 9.

The processing module 1101 is configured to obtain small data transmission SDT failure information.

The processing module 1101 is further configured to release an access stratum AS context of a terminal device based on the SDT failure information.

The sending module 1102 is configured to send a first request message to a core network device. The first request message includes the SDT failure information, and the first request message is used to request the core network device to release a non-access stratum NAS context of the terminal device.

In a possible design solution, the processing module 1101 is specifically configured to perform the following steps: receiving a second request message from the terminal device, where the second request message is used to request to resume an RRC connection; and starting SDT failure monitoring based on the second request message, and obtaining the SDT failure information.

In another possible design solution, the processing module 1101 is specifically configured to perform the following step: receiving the SDT failure information from a second access network device.

In a possible design solution, the processing module 1101 includes a distributed unit and a central unit, and the AS context includes a first AS context and a second AS context.

The distributed unit is configured to release the first AS context of the terminal device based on the SDT failure information.

The distributed unit is further configured to send a third request message to the central unit, where the third request message includes the SDT failure information, and the third request message is used to request the central unit to release the second AS context of the terminal device.

In another possible design solution, the processing module 1101 includes a distributed unit and a central unit, and the AS context includes a first AS context and a second AS context.

The central unit is configured to release the second AS context of the terminal device based on the SDT failure information.

The central unit is further configured to send a fourth request message to the distributed unit. The fourth request message includes the SDT failure information, and the fourth request message is used to request the distributed unit to release the first AS context of the terminal device.

In a possible design solution, the central unit is further configured to send a first request message to the core network device.

Further, the SDT failure information includes one or more of the following: duration of an SDT process is greater than or equal to a first SDT duration threshold; or a quantity of radio link control RLC retransmissions of SDT data reaches a first threshold for the quantity of RLC retransmissions of the SDT data.

Optionally, the communication apparatus 1100 further includes a receiving module 1103. The receiving module 1103 is configured to receive an acknowledgment message from the core network device. The acknowledgment message indicates that the core network device has completed release of the NAS context of the terminal device.

Optionally, the sending module and the receiving module may be integrated into one module, for example, a transceiver module (not shown in FIG. 11). The transceiver module is configured to implement a sending function and a receiving function of the communication apparatus 1100.

Optionally, the communication apparatus 1100 may further include a storage module (not shown in FIG. 11). The storage module stores a program or instructions. When the processing module executes the program or the instructions, the communication apparatus 1100 is enabled to perform the function of the first access network device in the communication methods shown in any one of FIG. 5 to FIG. 9.

It should be noted that the communication apparatus 1100 may be an access network device, or may be a chip (system) or another component or assembly that may be disposed in an access network device, or may be an apparatus including an access network device. This is not limited in this application.

In addition, for technical effect of the communication apparatus 1100, refer to the technical effect of the communication method shown in FIG. 5. Details are not described herein again.

Figure 12:
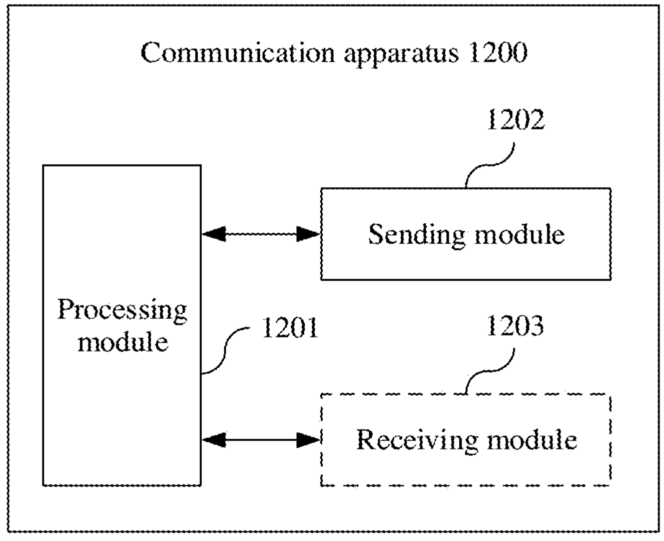
FIG. 12 is a diagram 2 of a structure of a communication apparatus according to an embodiment of this application.

For example, FIG. 12 is a diagram 2 of a structure of a communication apparatus according to an embodiment of this application. As shown in FIG. 12, a communication apparatus 1200 includes a processing module 1201 and a sending module 1202. For ease of description, FIG. 12 shows only main components of the communication apparatus.

In some embodiments, the communication apparatus 1200 may be applied to the communication system shown in FIG. 1, and perform functions of the second access network device in the communication methods shown in any one of FIG. 8 and FIG. 9.

The processing module 1201 is configured to obtain small data transmission SDT failure information.

The sending module 1202 is configured to send the SDT failure information to a first access network device.

In a possible design solution, the processing module 1201 is specifically configured to receive the SDT failure information from a terminal device.

Optionally, the communication apparatus 1200 may further include a receiving module 1203. The receiving module 1203 is configured to implement a receiving function of the communication apparatus 1200.

Optionally, the sending module and the receiving module may be integrated into one module, for example, a transceiver module (not shown in FIG. 12). The transceiver module is configured to implement a sending function and a receiving function of the communication apparatus 1200.

Optionally, the communication apparatus 1200 may further include a storage module (not shown in FIG. 12). The storage module stores a program or instructions. When the processing module executes the program or the instructions, the communication apparatus is enabled to perform the function of the second access network device in the communication methods shown in any one of FIG. 8 and FIG. 9.

It should be noted that the communication apparatus 1200 may be an access network device, or may be a chip (system) or another component or assembly that may be disposed in an access network device, or may be an apparatus including an access network device. This is not limited in this application.

In addition, for technical effect of the communication apparatus 1200, refer to the technical effect of the communication method shown in FIG. 5. Details are not described herein again.

Figure 13:
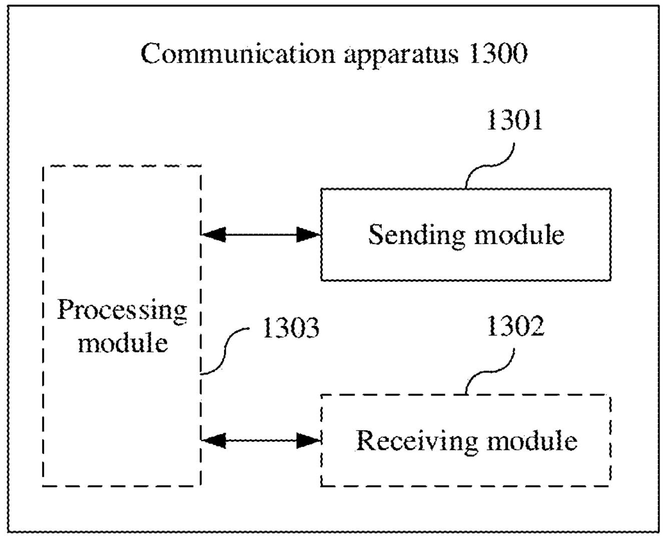
FIG. 13 is a diagram 3 of a structure of a communication apparatus according to an embodiment of this application.

For example, FIG. 13 is a diagram 3 of a structure of a communication apparatus according to an embodiment of this application. As shown in FIG. 13, a communication apparatus 1300 includes a sending module 1301. For ease of description, FIG. 13 shows only main components of the communication apparatus.

In some embodiments, the communication apparatus 1300 may be applied to the communication system shown in FIG. 1, and perform functions of the terminal device in the communication methods shown in any one of FIG. 6 to FIG. 10.

The sending module 1301 is configured to send small data transmission SDT failure information to a second access network device.

Optionally, the communication apparatus 1300 may further include a receiving module 1302. The receiving module is configured to implement a receiving function of the communication apparatus 1300.

Optionally, the sending module and the receiving module may be integrated into one module, for example, a transceiver module (not shown in FIG. 13). The transceiver module is configured to implement a sending function and a receiving function of the communication apparatus 1300.

Optionally, the communication apparatus 1300 may further include a processing module 1303. The processing module is configured to implement a processing function of the communication apparatus 1300.

Optionally, the communication apparatus 1300 may further include a storage module (not shown in FIG. 13). The storage module stores a program or instructions. When the processing module executes the program or the instructions, the communication apparatus is enabled to perform the function of the terminal device in the communication methods shown in any one of FIG. 6 to FIG. 10.

It should be noted that the communication apparatus 1300 may be a terminal device, or may be a chip (system) or another component or assembly that may be disposed in a terminal device, or may be an apparatus including a terminal device. This is not limited in this application.

In addition, for technical effect of the communication apparatus 1300, refer to the technical effect of the communication method shown in FIG. 5. Details are not described herein again.

Figure 14:
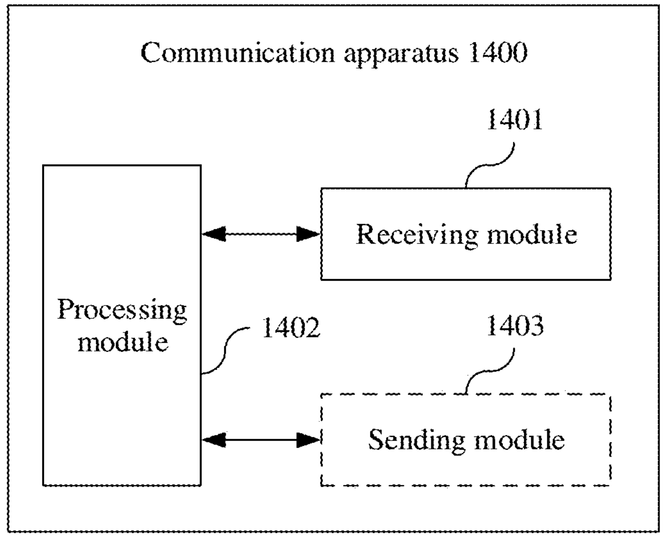
FIG. 14 is a diagram 4 of a structure of a communication apparatus according to an embodiment of this application.

For example, FIG. 14 is a diagram 4 of a structure of a communication apparatus according to an embodiment of this application. As shown in FIG. 14, a communication apparatus 1400 includes a receiving module 1401 and a processing module 1402. For ease of description, FIG. 14 shows only main components of the communication apparatus.

In some embodiments, the communication apparatus 1400 may be applied to the communication system shown in FIG. 1, and perform functions of the core network device in the communication methods shown in any one of FIG. 5 to FIG. 9.

The receiving module 1401 is configured to receive a first request message from a first access network device. The first request message is used to request the core network device to release a non-access stratum NAS context of a terminal device, and the first request message includes small data transmission SDT failure information.

The processing module 1402 is configured to release the NAS context of the terminal device based on the SDT failure information.

Optionally, the communication apparatus 1400 further includes a sending module 1403. The sending module is configured to send an acknowledgment message to the first access network device, where the acknowledgment message indicates that the core network device has completed release of the NAS context of the terminal device.

Optionally, the sending module and the receiving module may be integrated into one module, for example, a transceiver module (not shown in FIG. 14). The transceiver module is configured to implement a sending function and a receiving function of the communication apparatus 1400.

Optionally, the communication apparatus 1400 may further include a storage module (not shown in FIG. 14). The storage module stores a program or instructions. When the processing module executes the program or the instructions, the communication apparatus is enabled to perform the function of the core network device in the communication methods shown in any one of FIG. 5 to FIG. 9.

It should be noted that the communication apparatus 1400 may be a core network device, for example, an access and mobility management function (access and mobility management function, AMF), or may be a chip (system) or another component or assembly that may be disposed in a core network device, or may be an apparatus including a core network device. This is not limited in this application.

In addition, for technical effect of the communication apparatus 1400, refer to the technical effect of the communication method shown in FIG. 5. Details are not described herein again.

Figure 15:
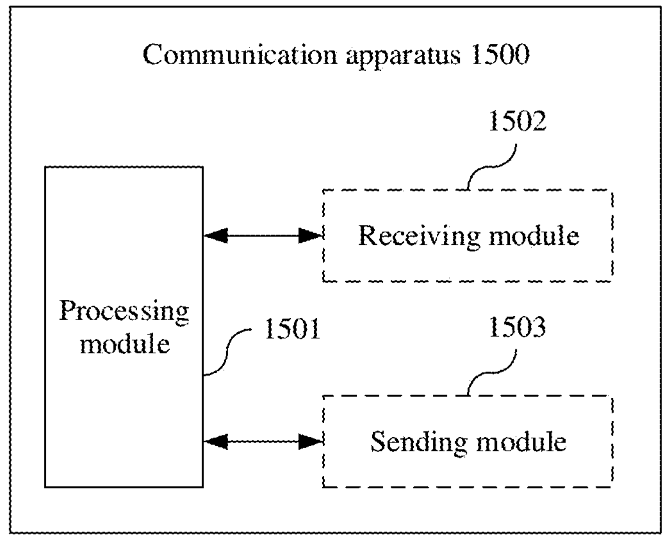
FIG. 15 is a diagram 5 of a structure of a communication apparatus according to an embodiment of this application.

For example, FIG. 15 is a diagram 5 of a structure of a communication apparatus according to an embodiment of this application. As shown in FIG. 15, a communication apparatus 1500 includes a processing module 1501. For ease of description, FIG. 15 shows only main components of the communication apparatus.

In some embodiments, the communication apparatus 1500 may be applied to the communication system shown in FIG. 1, and perform functions of the first access network device in the communication methods shown in any one of FIG. 5 to FIG. 10.

The processing module 1501 is configured to obtain small data transmission SDT failure information.

The processing module 1501 is further configured to determine SDT configuration information based on the SDT failure information. The SDT configuration information includes one or more of the following: a second SDT duration threshold, a second threshold for a quantity of RLC retransmissions, a second cell reselection threshold, or a second threshold for a quantity of retransmissions of a random access preamble. The second SDT duration threshold is greater than a first SDT duration threshold, the second threshold for the quantity of RLC retransmissions of the SDT data is greater than a first threshold for the quantity of RLC retransmissions of the SDT data, the second cell reselection threshold is greater than a first cell reselection threshold, and the second threshold for the quantity of retransmissions of the random access preamble is greater than a first threshold for the quantity of retransmissions of the random access preamble.

The first SDT duration threshold, the first threshold for the quantity of RLC retransmissions of the SDT data, the first cell reselection threshold, or the first threshold for the quantity of retransmissions of the random access preamble is used to determine the SDT failure information.

In a possible design solution, the processing module 1501 is specifically configured to receive the SDT failure information from a third access network device.

Further, the SDT failure information includes one or more of the following: duration of an SDT process is greater than or equal to the first SDT duration threshold; or the quantity of radio link control RLC retransmissions of the SDT data reaches the first threshold for the quantity of RLC retransmissions of the SDT data; or a difference between quality of a signal received by the terminal device from the third access network device and quality of a signal received by the terminal device from the first access network device is greater than or equal to the first cell reselection threshold; or a quantity of retransmissions of the random access preamble reaches the first threshold for the quantity of retransmissions of the random access preamble; or an identifier of the first access network device; or an identifier of the terminal device.

Optionally, the communication apparatus 1500 may further include a receiving module 1502. The receiving module 1502 is configured to implement a receiving function of the communication apparatus 1500.

Optionally, the communication apparatus 1500 may further include a sending module 1503. The sending module 1503 is configured to implement a sending function of the communication apparatus 1500.

Optionally, the sending module and the receiving module may be integrated into one module, for example, a transceiver module (not shown in FIG. 15). The transceiver module is configured to implement a sending function and a receiving function of the communication apparatus 1500.

Optionally, the communication apparatus 1500 may further include a storage module (not shown in FIG. 15). The storage module stores a program or instructions. When the processing module executes the program or the instructions, the communication apparatus is enabled to perform the function of the first access network device in the communication method shown in FIG. 10.

It should be noted that the communication apparatus 1500 may be an access network device, or may be a chip (system) or another component or assembly that may be disposed in an access network device, or may be an apparatus including an access network device. This is not limited in this application.

In addition, for technical effect of the communication apparatus 1500, refer to the technical effect of the communication method shown in FIG. 10. Details are not described herein again.

Figure 16:
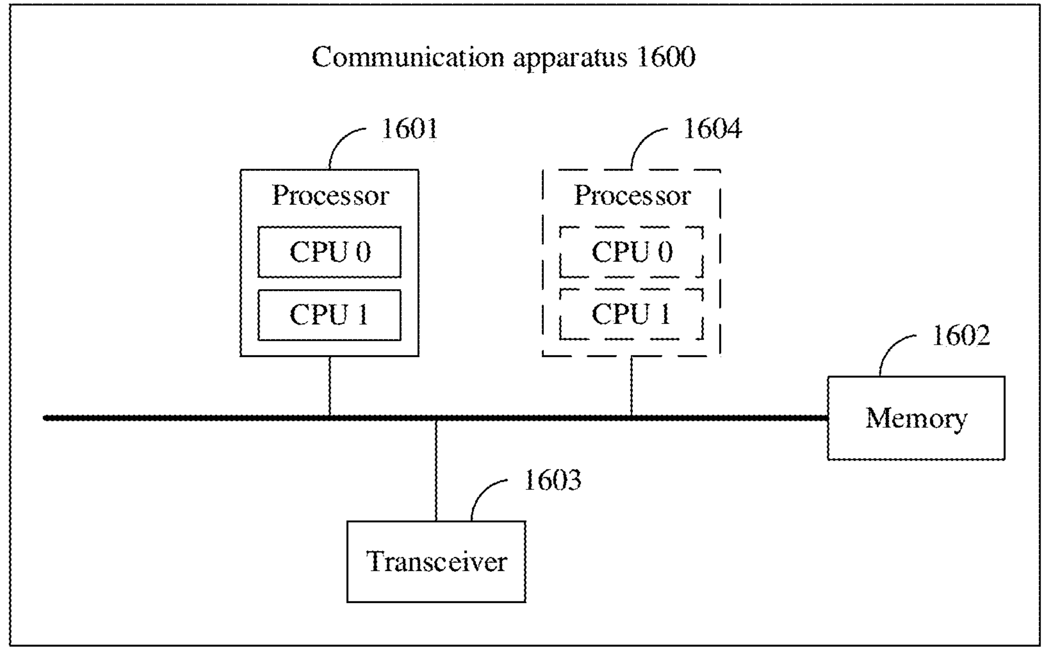
FIG. 16 is a diagram 6 of a structure of a communication apparatus according to an embodiment of this application.

For example, FIG. 16 is a diagram 6 of a structure of a communication apparatus according to an embodiment of this application. The communication apparatus may be a terminal device or a network device, or may be a chip (system) or another component or assembly that can be disposed in a terminal device, an access network device, or a core network device. As shown in FIG. 16, a communication apparatus 1600 may include a processor 1601. Optionally, the communication apparatus 1600 may further include a memory 1602 and/or a transceiver 1603. The processor 1601 is coupled to the memory 1602 and the transceiver 1603, for example, may be connected through a communication bus.

The following describes components of the communication apparatus 1600 in detail with reference to FIG. 16.

The processor 1601 is a control center of the communication apparatus 1600, and may be one processor, or may be a collective name of a plurality of processing elements. For example, the processor 1601 is one or more central processing units (central processing unit, CPU), may be an application specific integrated circuit (application specific integrated circuit, ASIC), or may be one or more integrated circuits configured to implement embodiments of this application, for example, one or more digital signal processors (digital signal processors, DSP), or one or more field programmable gate arrays (field programmable gate arrays, FPGA).

Optionally, the processor 1601 may perform various functions of the communication apparatus 1600 by running or executing a software program stored in the memory 1602 and invoking data stored in the memory 1602.

During specific implementation, in an embodiment, the processor 1601 may include one or more CPUs, such as a CPU 0 and a CPU 1 shown in FIG. 16.

During specific implementation, in an embodiment, the communication apparatus 1600 may alternatively include a plurality of processors, for example, the processor 1601 and a processor 1604 shown in FIG. 16. Each of the processors may be a single-CPU (single-CPU) processor or may be a multi-CPU (multi-CPU) processor. The processor herein may be one or more devices, circuits, and/or processing cores configured to process data (for example, computer program instructions).

The memory 1602 is configured to store a software program for executing the solutions of this application, and the processor 1601 controls execution of the software program. For a specific implementation, refer to the foregoing method embodiments. Details are not described herein again.

Optionally, the memory 1602 may be a read-only memory (ROM) or another type of static storage device that can store static information and instructions, a random access memory (RAM) or another type of dynamic storage device that can store information and instructions, an electrically erasable programmable read-only memory (EEPROM), a compact disc read-only memory (CD-ROM) or another compact disc storage, an optical disc storage (including a compact optical disc, a laser disc, an optical disc, a digital versatile disc, a Blu-ray optical disc, and the like), a magnetic disc storage medium or another magnetic storage device, or any other medium that can carry or store expected program code in a form of an instruction or a data structure and that can be accessed by a computer. However, the memory 1602 is not limited thereto. The memory 1602 may be integrated with the processor 1601, or may exist independently, and is coupled to the processor 1601 through an interface circuit (not shown in FIG. 16) of the communication apparatus 1600. This is not specifically limited in this embodiment of this application.

The transceiver 1603 is configured to communicate with another communication apparatus. For example, the communication apparatus 1600 is a terminal device, and the transceiver 1603 may be configured to communicate with an access network device, or communicate with another terminal device. For another example, the communication apparatus 1600 is an access network device, and the transceiver 1603 may be configured to communicate with a terminal device, or communicate with another access network device.

Optionally, the transceiver 1603 may include a receiver and a transmitter (not separately shown in FIG. 16). The receiver is configured to implement a receiving function, and the transmitter is configured to implement a sending function.

Optionally, the transceiver 1603 may be integrated with the processor 1601, or may exist independently, and is coupled to the processor 1601 through an interface circuit (not shown in FIG. 16) of the communication apparatus 1600. This is not specifically limited in this embodiment of this application.

It should be noted that the structure of the communication apparatus 1600 shown in FIG. 16 does not constitute a limitation on the communication apparatus. An actual communication apparatus may include more or fewer components than those shown in the figure, or combine some components, or have different component arrangements.

In addition, for technical effect of the communication apparatus 1600, refer to the technical effect of the communication method in any one of the foregoing method embodiments. Details are not described herein again.

An embodiment of this application provides a communication system. The communication system includes the one or more terminal devices, one or more access network devices, and one or more core network devices.

An embodiment of this application further provides a computer-readable storage medium. The computer-readable storage medium stores instructions. When the instructions are run on a computer, the computer is enabled to perform the communication methods shown in any one of FIG. 5 to FIG. 10.

An embodiment of this application provides a computer program product including instructions. The computer program product includes a computer program or instructions. When the computer program or the instructions are run on a computer, the computer is enabled to perform the communication methods shown in any one of FIG. 5 to FIG. 10.

It should be understood that, the processor in embodiments of this application may be a central processing unit (central processing unit, CPU), or the processor may be another general-purpose processor, a digital signal processor (digital signal processor, DSP), an application specific integrated circuit (application specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. By way of example but not limitative description, random access memories (random access memories, RAM) in many forms may be used, for example, a static random access memory (static RAM, SRAM), a dynamic random access memory (dynamic random access memory, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented using software, hardware (for example, circuit), firmware, or any combination thereof. When software is used to implement embodiments, the foregoing embodiments may be implemented completely or partially in a form of a computer program product. The computer program product includes one or more computer instructions or computer programs. When the program instructions or the computer programs are loaded and executed on a computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, and microwave, or the like) manner. The computer-readable storage medium may be any usable medium accessible by a computer, or a data storage device, like a server or a data center, including one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association between associated objects and represents that three relationships may exist. For example, A and/or B may represent the following three cases: only A exists, both A and B exist, and only B exists. A and B may be singular or plural. In addition, the character "/" in this specification usually indicates an "or" relationship between the associated objects, but may alternatively indicate an "and/or" relationship. For details, refer to the context for understanding.

In this application, at least one means one or more, and a plurality of means two or more. "At least one of the following items (pieces)" or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of embodiments.

In addition, function units in embodiments of this application may be integrated into one processing unit, each of the units may exist alone physically, or two or more units are integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in the form of a software product. The computer software product is stored in a storage medium and includes several instructions for instructing a computing device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, applied to a first access network device, wherein the method comprises:

obtaining small data transmission (SDT) failure information;

releasing an access stratum (AS) context of a terminal device based on the SDT failure information; and sending a first request message to a core network device, wherein the first request message comprises the SDT failure information, and the first request message requests the core network device to release a non-access stratum (NAS) context of the terminal device.

2. The method according to claim 1, wherein obtaining the SDT failure information comprises:

receiving a second request message from the terminal device, wherein the second request message requests to resume a radio resource control (RRC) connection; and in response to the second request message, starting SDT failure monitoring and obtaining the SDT failure information.

3. The method according to claim 1, wherein obtaining the SDT failure information comprises:

receiving the SDT failure information from a second access network device.

4. The method according to claim 1, wherein:

the first access network device comprises a distributed unit and a central unit;

the AS context comprises a first AS context and a second AS context; and releasing the AS context of the terminal device based on the SDT failure information comprises:

releasing, by the distributed unit, the first AS context of the terminal device based on the SDT failure information; and sending, by the distributed unit, a third request message to the central unit, wherein the third request message comprises the SDT failure information, and the third request message requests the central unit to release the second AS context of the terminal device.

5. The method according to claim 4, wherein sending the first request message to the core network device specifically comprises:

sending, by the central unit, the first request message to the core network device.

6. The method according to claim 1, wherein:

the first access network device comprises a distributed unit and a central unit;

the AS context comprises a first AS context and a second AS context; and releasing the AS context of the terminal device based on the SDT failure information comprises:

releasing, by the central unit, the second AS context of the terminal device based on the SDT failure information; and sending, by the central unit, a fourth request message, wherein the fourth request message comprises the SDT failure information, and the fourth request message requests the distributed unit to release the first AS context of the terminal device.

7. The method according to claim 1, wherein the SDT failure information comprises:

a duration of an SDT process is greater than or equal to a first SDT duration threshold.

8. The method according to claim 7, wherein the SDT failure information comprises:

a quantity of radio link control (RLC) retransmissions of SDT data reaches a first threshold for the quantity of RLC retransmissions of the SDT data.

9. The method according to claim 1, wherein the SDT failure information comprises:

a quantity of radio link control (RLC) retransmissions of SDT data reaches a first threshold for the quantity of RLC retransmissions of the SDT data.

10. The method according to claim 1, wherein the method further comprises:

receiving an acknowledgment message from the core network device, wherein the acknowledgment message indicates that the core network device has completed release of the NAS context of the terminal device.

11. An apparatus, wherein the apparatus comprises:

at least one processor; and at least one memory coupled to the at least one processor and configured to store executable instructions for execution by the at least one processor to instruct the at least one processor to:

obtain small data transmission (SDT) failure information;

release an access stratum (AS) context of a terminal device based on the SDT failure information; and send a first request message to a core network device, wherein the first request message comprises the SDT failure information, and the first request message requests the core network device to release a non-access stratum (NAS) context of the terminal device.

12. The apparatus according to claim 11, wherein the executable instructions further instruct the at least one processor to:

receive a second request message from the terminal device, wherein the second request message requests to resume a radio resource control (RRC) connection; and in response to the second request message, start SDT failure monitoring and obtain the SDT failure information.

13. The apparatus according to claim 11, wherein the executable instructions further instruct the at least one processor to:

receive the SDT failure information from a second access network device.

14. The apparatus according to claim 11, wherein the AS context comprises a first AS context and a second AS context, and the executable instructions further instruct the at least one processor to:

release the first AS context of the terminal device based on the SDT failure information; and send a third request message to a central unit of the at least one processor, wherein the third request message comprises the SDT failure information, and the third request message requests the central unit to release the second AS context of the terminal device.

15. The apparatus according to claim 14, wherein the executable instructions further instruct the at least one processor to:

send the first request message to a core network device.

16. The apparatus according to claim 11, wherein the AS context comprises a first AS context and a second AS context, and the executable instructions further instruct the at least one processor to:

release the second AS context of the terminal device based on the SDT failure information; and send a fourth request message to a distributed unit of the at least one processor, wherein the fourth request message comprises the SDT failure information, and the fourth request message requests the distributed unit to release the first AS context of the terminal device.

17. The apparatus according to claim 11, wherein the SDT failure information comprises:

a duration of an SDT process is greater than or equal to a first SDT duration threshold.

18. The apparatus according to claim 17, wherein the SDT failure information comprises:

a quantity of radio link control (RLC) retransmissions of SDT data reaches a first threshold for the quantity of RLC retransmissions of the SDT data.

19. The apparatus according to claim 11, wherein the SDT failure information comprises:

a quantity of radio link control (RLC) retransmissions of SDT data reaches a first threshold for the quantity of RLC retransmissions of the SDT data.

20. The apparatus according to claim 11, wherein the executable instructions further instruct the at least one processor to:

receive an acknowledgment message from a core network device, wherein the acknowledgment message indicates that the core network device has completed release of the NAS context of the terminal device.

* * * * *